(12) United States Patent
Lamouchi et al.

(10) Patent No.: US 9,379,990 B2
(45) Date of Patent: Jun. 28, 2016

(54) SYSTEM AND METHOD FOR STREAMING A MEDIA FILE FROM A SERVER TO A CLIENT DEVICE

(71) Applicant: VANTRIX CORPORATION, Montreal (CA)

(72) Inventors: Mohammed Hichem Lamouchi, Verdun (CA); Benjamin Charles Bazso, La Prairie (CA); Steve Ian Coulombe, Sainte-Julie (CA)

(73) Assignee: Vantrix Corporation, Montreal (CA)

(*) Notice: Subject to any disclaimer, the term of this patent is extended or adjusted under 35 U.S.C. 154(b) by 203 days.

(21) Appl. No.: 14/254,733

(22) Filed: Apr. 16, 2014

(65) Prior Publication Data
US 2014/0351450 A1    Nov. 27, 2014

Related U.S. Application Data

(60) Provisional application No. 61/827,718, filed on May 27, 2013.

(51) Int. Cl.
*G06F 15/16* (2006.01)
*H04L 12/801* (2013.01)

(52) U.S. Cl.
CPC ...................................... *H04L 47/29* (2013.01)

(58) Field of Classification Search
USPC .......................... 709/230, 231, 236, 234, 233
See application file for complete search history.

(56) References Cited

U.S. PATENT DOCUMENTS

| | | | |
|---|---|---|---|
| 8,438,301 B2 | 5/2013 | Knowlton et al. | |
| 2009/0129442 A1* | 5/2009 | Mohebbi | H04B 7/155 375/130 |
| 2012/0144445 A1* | 6/2012 | Bonta | H04L 12/1868 725/116 |
| 2013/0007223 A1 | 1/2013 | Luby et al. | |

OTHER PUBLICATIONS

"Overview of MPEG-DASH Standard", retrieved from URL: http://dashif.org/mpeg-dash/, Mar. 26, 2013.
Jan Ozer, "What is HLS (HTTP Live Streaming)?", URL: http://www.streamingmedia.com/Articles/Editorial/What-Is-.../What-is-HLS-%28HTTP-Live-Streaming%29-78221.aspx, Oct. 14, 2011.
"What is MPEG-4 Format", URL: http://www.winxdvd.com/resource/mpeg-4.htm, Mar. 26, 2013.
"2G, 3G, 4G, 4G LTE—What are They", URL: http://www.whatsag.com, Mar. 26, 2013.
Wikipedia, "Streaming media", URL://www.en.wikipedia.org/wiki/Streaming_media, Mar. 26, 2013.

* cited by examiner

*Primary Examiner* — Lan-Dai T Truong
(74) *Attorney, Agent, or Firm* — IP-MEX INC; Victoria Donnelly

(57) ABSTRACT

A method for streaming a media file from a server to a client device is provided. The method provides for streaming requested chunks of the media file from the server to the client device. The method determines a rate for streaming the requested chunk to the client device by using relationships between the requested chunk, the media file, current chunks, and current streaming rates. Provided a seek operation is determined, the requested chunk is streamed at a burst rate or a throttle rate. The method is especially useful for reducing latency and saving bandwidth. A corresponding system for streaming the media file from the server to the client device is also provided.

21 Claims, 19 Drawing Sheets

SYSTEM AND METHOD FOR STREAMING A MEDIA FILE FROM A SERVER TO A CLIENT DEVICE

RELATED APPLICATIONS

The present application claims benefit from the U.S. provisional application Ser. No. 61/827,718 filed on May 27, 2013, entire contents of which are incorporated herein by reference.

FIELD OF THE INVENTION

The present invention relates to playback of media files over a network, and more particularly to a system and method for streaming a media file from a server to a client device.

BACKGROUND OF THE INVENTION

In normal operation, a media file is streamed from a server computer to a client device by making multiple HTTP (Hyper-Text Transport Protocol) requests to download one or multiple segments, also known as: byte ranges or chunks, of the media file at a time. The client device may be, for example, a smart phone or desktop computer running a media player. At any time during the streaming of the media file, a user operating the media player may initiate a seek operation to start playing from anywhere inside the media file. The seek operation may be for a chunk that is forward or backward from the chunk in the media file currently being streamed when the seek operation is performed. The user typical initiates the seek operation by moving a slider on the media player.

The server computer throttles a rate of delivery of the chunks to the client device in order not to waste bandwidth. Alternatively, the server computer may stream chunks as fast as possible at a burst rate and rely on the client device to throttle the rate of delivery of the chunks.

The user may move the slider at any time when streaming a media file, hence initiating a seek operation. If the media file is being streamed at the throttle rate, a latency time, that is a time it takes for the media file to restart playing the media file at the desired point, is aggravated. On the other hand, if the media file is being streamed at the burst rate when the user move the slider, bandwidth used for previously streaming chunks may be wasted.

Accordingly, there is a need in the industry for the development of methods and systems that would mitigate latency and wasted bandwidth when streaming a multimedia file from a server to a client device.

BRIEF DESCRIPTION OF THE DRAWINGS

Further features and advantages of the present invention will be apparent from the following description of the embodiment, which is described by way of example only and with reference to the drawings in which.

SUMMARY OF THE INVENTION

Figure 1:
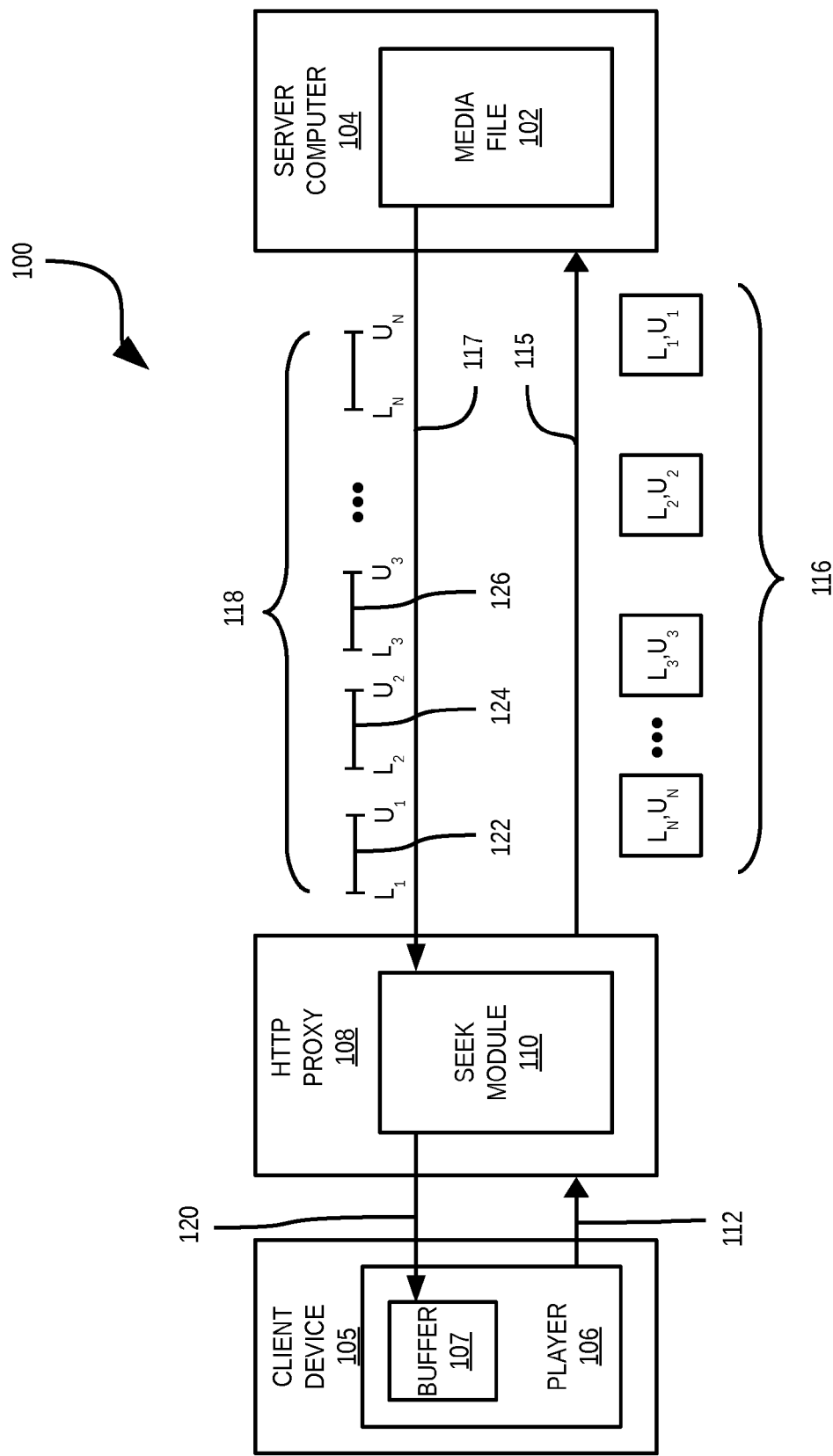
FIG. 1 shows a system configured to stream a media file from a server to a client device according to an embodiment of the present invention.

It is an object of the present invention to provide an improved system and method for streaming a media file from a server to a client device.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for streaming a media file from a server computer to a client device, the method including:

(a) receiving a requested chunk of the media file from the server computer;

(b) provided one or more of the following conditions are met:

(i) a range of the requested chunk overlaps with data from a current chunk streamed to the client device;

(ii) the requested chunk is a logical successor to the current chunk;

streaming the requested chunk to the client device at a throttled rate;

(c) otherwise, streaming the requested chunk to the client device at a burst rate for at least a predetermined burst duration.

Conveniently, the predetermined burst duration may be chosen from a range of about 1 msec. to about 10 sec.

Preferably, the burst rate is equal to a burst factor times the throttle rate, and a value of the burst factor is chosen from a range from about 2 to about 10.

Advantageously, the method may further include streaming a remaining part of the requested chunk to the client device at the throttled rate after the predetermined burst duration.

Conveniently, the step (c) may further include streaming the requested chunk at the burst rate provided the range of the requested chunk precedes in the media file with respect to the current chunk.

Preferably, the step (c) may further include streaming the requested chunk at the burst rate provided the range of the requested chunk includes an entire media file.

Advantageously, a type of protocol used for streaming the media file from the server to the client device may be chosen from a list including of HTTP (hyper-text transfer protocol), HTTPS (HTTP Secure), and Bluetooth.

Conveniently, the media file may include an audio track and a video track; and receiving the requested chunk may include receiving a requested chunk from the audio track of the media file and a requested chunk from the video track of the media file.

Advantageously, a type of protocol used for streaming the media file from the server to the client device may be chosen from a list including of MPEG-DASH (Motion Picture Expert Group-Dynamic Adaptive Streaming over HTTP) and HLS (HTTP Live Streaming).

Conveniently, the method may include asynchronously receiving the requested chunk from the audio track of the media file and the requested chunk from the video track of the media file, and synchronously streaming the requested chunk from the audio track of the media file and the requested chunk from the video track of the media file to the client device.

Alternatively, the method may include synchronously receiving the requested chunk from the audio track of the media file and the requested chunk from the video track of the media file, and synchronously streaming the requested chunk from the audio track of the media file and the According to another aspect of the invention, there is provided a system configured to stream a media file from a server computer to a client device, the system including:

a receiving chunk request module configured to receive a requested chunk of the media file from the server computer;

a data streamed overlap detection module configured to determine that a range of the requested chunk overlaps with data from a current chunk streamed to the client device;

a logical successor in media file detection module configured to detect that the requested chunk is a logical successor to the current chunk; and a chunk streaming module configured to stream the requested chunk to the client device at a throttled rate provided that one or more of the following conditions are met:

(i) the range of the requested chunk overlaps with data from a current chunk streamed to the client device, (ii) the requested chunk is a logical successor to the current chunk;

otherwise stream the requested chunk to the client device at a burst rate for at least a predetermined burst duration.

Conveniently, a value of the predetermined burst duration may be chosen from a range of about 1 msec. to about 10 sec.

Preferably, the burst rate is equal to a burst factor times the throttle rate, and a value of the burst factor may be chosen from a range from about 2 to about 10.

Advantageously, the system may further include a burst duration module configured to determine that the requested chunk has been streamed to the client device for the predetermined burst duration.

Beneficially, the system may further include a back in media file detection module for detecting that the requested chunk precedes in the media file with respect to the current chunk, and wherein the chunk streaming module is further configured to stream the requested chunk at the burst rate provided the range of the requested chunk precedes in the media file with respect to the current chunk.

Advantageously, the system may further include an entire media file detection module for detecting that the range of the requested chunk includes an entire media file, and wherein the chunk streaming module is further configured to stream the requested chunk at the burst rate provided the range of the requested chunk includes the entire media file.

Conveniently, a type of protocol used for streaming the media file from the server to the client device may be chosen from a list consisting of HTTP (Hyper-Text Transfer Protocol), HTTPS (HTTP Secure), and Bluetooth.

Beneficially, the media file may include an audio track and a video track; and the receiving chunk request module is further configured to asynchronously receive a requested chunk from the audio track of the media file, and a requested chunk from the video track of the media file.

Advantageously, the media file may include an audio track and a video track; and the receiving chunk request module is further configured to synchronously receive a requested chunk from the audio track of the media file, and a requested chunk from the video track of the media file.

Conveniently, a type of protocol used for streaming the media file from the server to the client device may be chosen from a list consisting of MPEG-DASH (Motion Picture Expert Group-Dynamic Adaptive Streaming over HTTP) and HLS (HTTP Live Streaming).

Beneficially, the system may further include a track synchronization module configured to synchronize streaming of the requested chunk from the audio track of the media file and the requested chunk from the video track of the media file to the client device.

Other embodiments of this invention include corresponding computer systems, apparatus, and computer programs recorded on one or more computer storage devices, each configured to perform the actions of the methods described above.

Implementations of the described embodiments may include hardware, a method or process, or computer software on a computer-accessible storage media.

Thus, an improved system and method for streaming a media file from a server to a client device have been provided.

DETAILED DESCRIPTION OF EMBODIMENTS OF THE INVENTION

Embodiments of the present invention as described herein below, provide a system and method for streaming a media file from a server computer to a client device that reduces latency and saves bandwidth.

For the convenience of the reader a table linking elements in the text to reference numbers in the drawings is provided below.

TABLE OF ELEMENTS

| Reference Number(s) | Element(s) |
|---|---|
| 1, 2, 3, 4 | Inter-sheet connectors |
| 100 | System |
| 102 | Media File |
| 104 | Server Computer |
| 105 | Client |
| 106 | Media Player |
| 107 | Buffer |
| 108 | HTTP Proxy Server |
| 110 | Seek Module |
| 112 | Player to Proxy Uplink |
| 115 | Proxy Server to Server Link |
| 116 | Chunk Requests |
| 117 | Server to Proxy Link |
| 118, 122, 124, 126 | Requested Chunks |
| 120 | Streaming from Proxy Server to Client Device |
| $L_N$, $U_N$ | Lower, Upper Limits of Requested Chunks |
| 200 | Mapping of Requested Chunks to Player Timeline |
| 212 | Player Timeline |
| t | Time of Receiving Requested Chunk |
| Z | First Part of Requested Chunk Streamed at Burst Rate |
| X | Remaining Part of Requested Chunk Streamed at Throttled Rate |
| $t_Z$ | Burst Rate Duration |
| $t_Y$ | Latency Time |
| 300 | HTTP Proxy Server Block Diagram |
| 302 | Processor |
| 304 | Memory |
| 400 | Seek Module Block Diagram |
| 402 | Requested Chunk Receiving Module |
| 404 | Seek Request Determination Module Input |
| 406 | Seek Request Determination Module |
| 408 | Seek Request Determination Module Output |
| 410 | Burst/Throttle Rate Module |
| 412 | Burst Duration Module |
| 414 | Chunk Stream Module |
| 500 | Seek Request Determination Module Block Diagram |
| 501 | First Chunk Determination Module |
| 502 | Entire Media File Detection Module |
| 504 | Back in Media File Detection Module |
| 506 | Forward in Media File Detection Module |
| 508 | Logical Successor in Media File Detection Module |
| 510 | Data Sent Overlap Detection Module |
| 512 | Previous Data Sent Overlap Detection Module |
| 514 | Ongoing Data Sent Overlap Detection Module |
| 600 | Flowchart of Method |
| 602-626 | Steps of Method |
| 700 | Mapping of Requested Chunk to Player Timeline Where Requested Chunk is Entire File |
| 704, 804, 904, 1004, 1104, 1204 | Requested Chunk (R) |
| S | Data of Current Chunk Streamed by Time t |
| R | Range of Requested Chunk in Media File |
| A | Offset of lower ($L_R$) end of Range (R) of Requested Chunk |
| B | Offset of upper ($U_R$) end of Range (R) of Requested Chunk |
| 800 | Mapping of Requested Chunk to Player Timeline Where Requested Chunk is Back in Media File |
| 802, 902, 1002, 1102 | Current Chunk (Q) |
| Q | Range of Current Chunk in Media File |
| C | Offset of lower ($L_Q$) end of Range (Q) of Current Chunk |
| D | Offset of upper ($U_Q$) end of Range (Q)) of Current Chunk |
| 900 | Mapping of Requested Chunk to Player Timeline Where Requested Chunk is Forward in Media File |
| 1000 | Mapping of Requested Chunk to Player Timeline Where Requested Chunk is Logical Successor in Media File |
| 1100 | Mapping of Requested Chunk to Player Timeline Where Requested Chunk Overlaps Data Streamed for Current Chunk |
| 1200 | Mapping of Requested Chunk to Player Timeline Where Requested Chunk Overlaps Data Streamed for Ongoing Chunk |
| 1202 | Ongoing Chunk (Q) |
| 1300 | System |
| 1302 | Multi-Track Seek Module |
| 1304 | Multi-Track Chunk Requests |
| 1306, 1308 to 1318 | Requested Multi-Track Chunks |
| 1320 | Multi-Track Media File |
| 1400 | Mapping of Requested Chunks of Audio Track to Player Timeline |
| 1500 | Mapping of Requested Chunks of Video Track to Player Timeline |
| 1600 | HTTP Proxy Server Block Diagram |
| 1700 | Multi-Track Seek Module Block Diagram |
| 1702 | Receiving Chunk Request Module |
| 1704 | Seek Request Determination Module Input |
| 1706 | Seek Request Determination Module |
| 1708 | Seek Request Determination Module Output |
| 1710 | Burst/Throttle Rate Module |
| 1712 | Burst Duration Module |
| 1714 | Chunk Stream Module |
| 1716 | Track Synchronization Module |
| 1800 | Multi-Track Seek Request Determination Module |
| 1801 | First Chunk Detection Module |
| 1802 | Entire Media File Detection Module |
| 1804 | Back in Media File Detection Module |
| 1806 | Forward in Media File Detection Module |
| 1808 | Logical Successor in Media File Detection Module |
| 1810 | Data Sent Overlap Detection Module |
| 1812 | Previous Data Sent Overlap Detection Module |
| 1814 | Ongoing Data Sent Overlap Detection Module |

Referring to FIG. 1 there is shown a system 100 configured to stream a media file 102 from a server computer 104 to a media player 106 on a client device 105. The media player 106 may have conventional features such as, for example, a video screen, audio speakers, a play button, a pause button, and a slider (not shown) for a user (not shown) for interacting with the media player 106. The client device 105 may be, for example, a mobile device, laptop computer or desktop computer. The media file may be, for example, an audio file such as a WAV (Microsoft™ Wave) file, AAC (Advanced Audio Coding) file, or the like. The media file also may be, for example, a multimedia file such as MPEG-4 (Motion Picture Expert Group version 4) file, MOV (QuickTime) file, or the like.

The system 100 preferably includes a Hyper-Text Transport Protocol (HTTP) proxy server 108 including a seek module 110. Alternatively, a type of the proxy server 108 may be a Hyper-Text Transport Protocol Secure (HTTPS) proxy server or a Bluetooth server.

The seek module 110 receives 112 chunk requests 116 from the player 106 and sends 115 the chunk requests 116 to the server computer 104. Each chunk request 116 includes a lower limit (L) and an upper limit (U) of a range of data in the media file 102. The server computer 104 in response to the chunk requests 116 from the seek module 110 sends 117 requested chunks 118 of the media file 102 to the HTTP proxy server 108 which streams 120 the requested chunks 118 to the media player 106 on the client device 105. The media player 106 stores each requested chunk 118 in a buffer 107 as it is streamed 120 and played on the media player 106.

A rate of sending 115 of the chunk requests 116 from the HTTP proxy server 108 to the server computer 104 and the sending 117 of the requested chunks 118 from the server computer 104 to the HTTP proxy server 108 is preferably at a conventional network rate. A rate of sending 112 of the chunk requests 116 from the client device 105 to the HTTP proxy server 108 and streaming 120 the requested chunks 118 from the HTTP proxy server 108 to the client device 105 is preferably at a rate compatible with conventional wireless communication standards such as 3G (Third Generation), 4G (Fourth Generation), LTE (Long Term Evolution), or the like.

The lower limits (L) and upper limits (U) of the ranges of the requested chunks 118 are determined by the media player 106 based on a user (not shown) pressing the play button, pressing the pause button, or moving the slider. The user may, for example, play the entire media file 102 on the player 106 from start to finish; stop and start the player 106, using the pause button, at any time while playing the media file 102; or restart playing the media file 102 from any point in the media file 102 by moving the slider, also referred to herein as seeking, while playing the media file 102 including seeking ahead in the media file 102 and seeking back in the media file 102.

The seek module 110, as described in detail herein below, determines a rate of streaming for streaming the requested chunks 118 from the HTTP proxy server 108 to the client device 105 depending on a seek request initiated by the user moving the slider or pressing the buttons on the player 106. The seek module 110 may determine to stream 120 a requested chunk, any one of 118, or a portion thereof at a throttled rate or a burst rate. Throttling is an intentional slowing of a network service by a server such as the HTTP proxy server 108. The throttle bitrate, or throttle rate is a rate, for example a slowest rate, that allows the player 106 to play the requested chunk 118 without any undesirable effects, such as latency, a delay of the player starting to play the requested chunk, noticed by the user. The burst bitrate, or burst rate is any rate that is faster than the throttle rate. Preferably the burst rate is substantially faster than the throttled rate. The burst rate may be, for example, five times faster or even ten times faster than the throttle rate. Alternatively, the burst rate may be a fastest rate allowed by the wireless communication standard used between the HTTP proxy server 108 and the client device 105. In the embodiments of the invention, a media bitrate, or media rate, is an average bitrate of the media file; throttle rate is the rate at which the media file is delivered during the throttling phase; and burst rate is the rate at which the media file is delivered during the burst rate. In some embodiments of the invention, the throttling rate may be a factor of the media rate, for example, throttling rate may be a few times higher/faster than the media bitrate, for example, twice as fast. The burst rate is also a factor of the media bitrate, but higher than the throttling rate.

Figure 7:
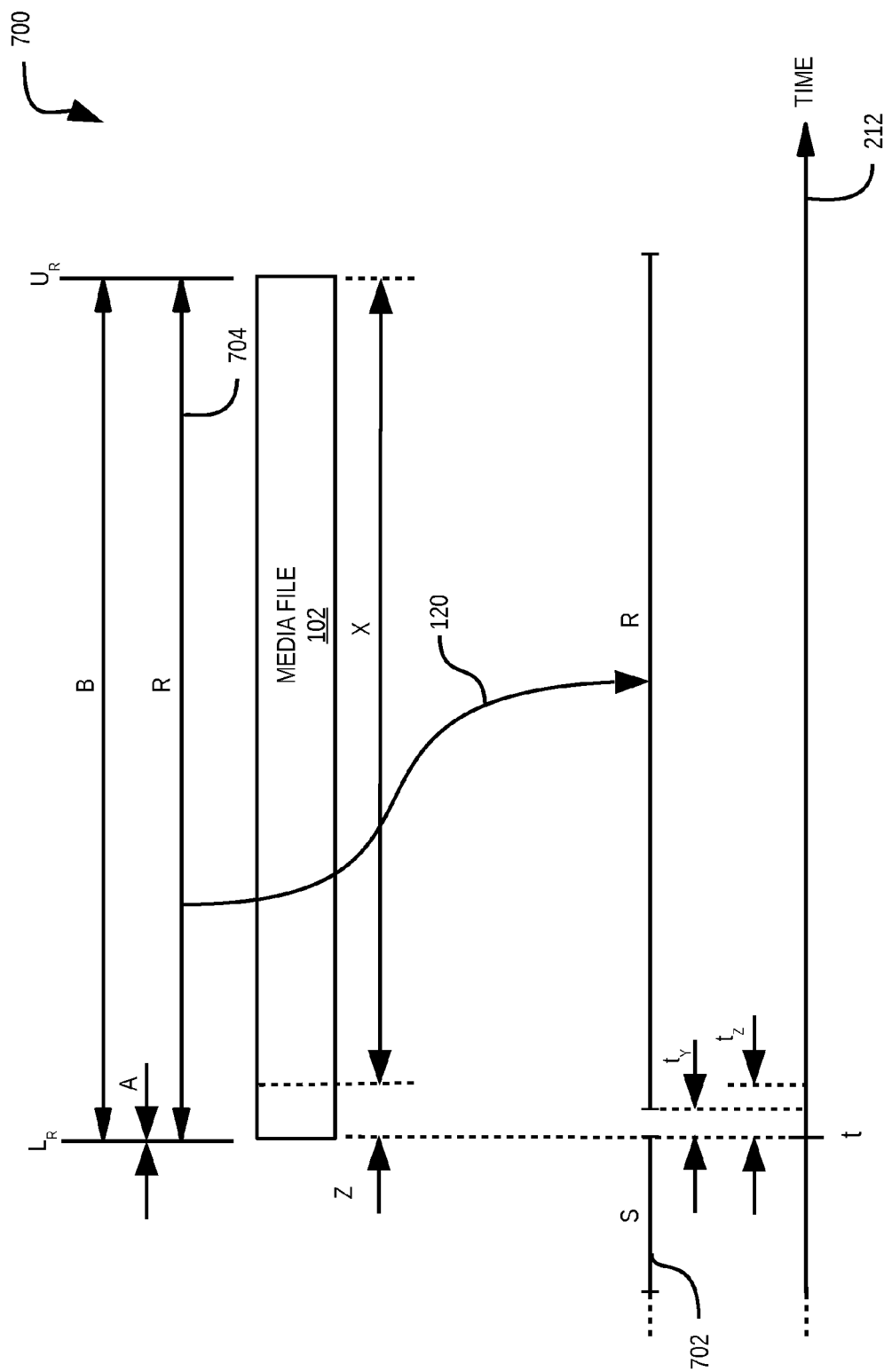
FIG. 7 shows a timeline of a requested chunk including an entire media file being streamed from the server to the client device shown in FIG. 1.
Figure 8:
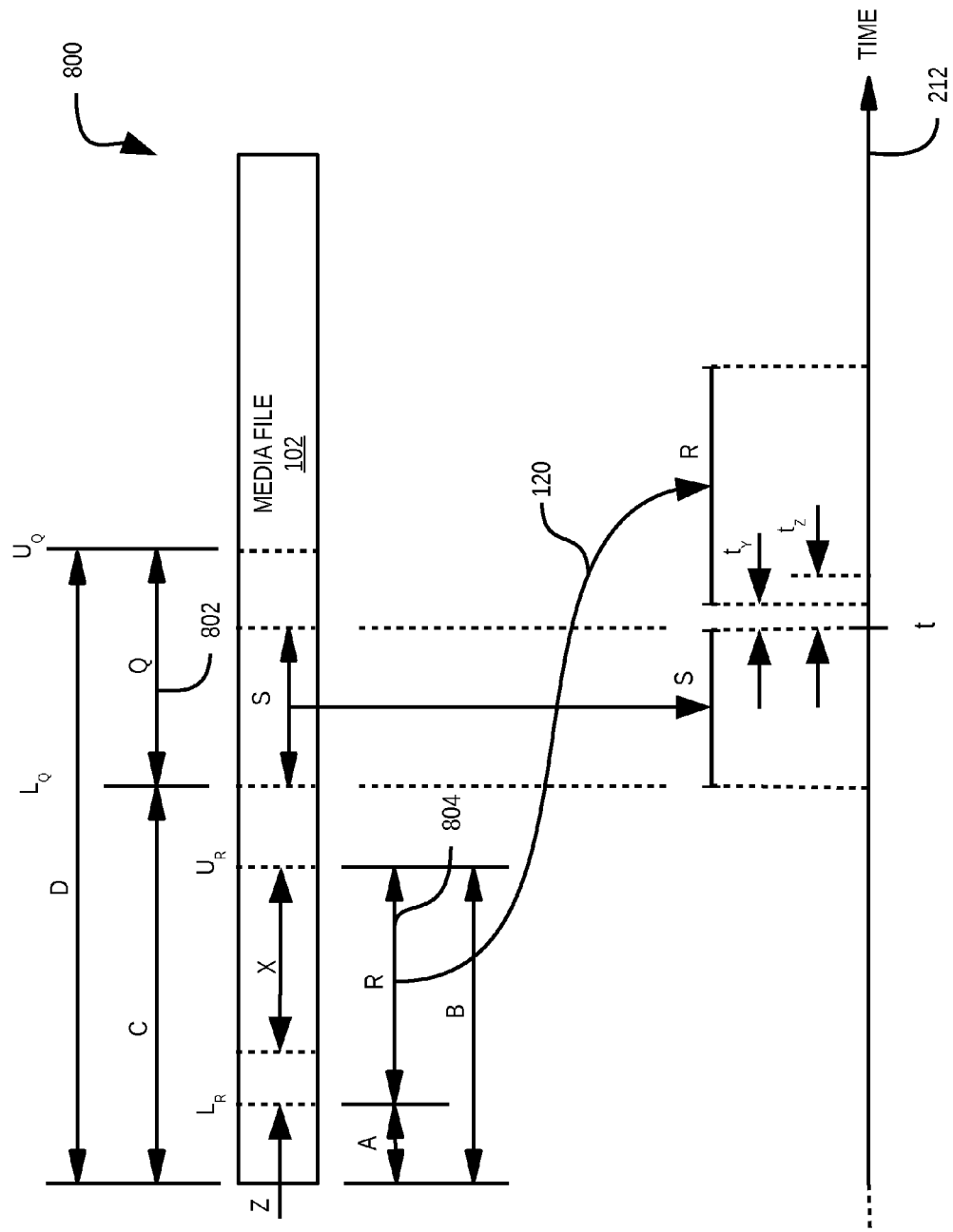
FIG. 8 shows a timeline of a requested chunk back in the media file being streamed from the server to the client device shown in FIG. 1.
Figure 9:
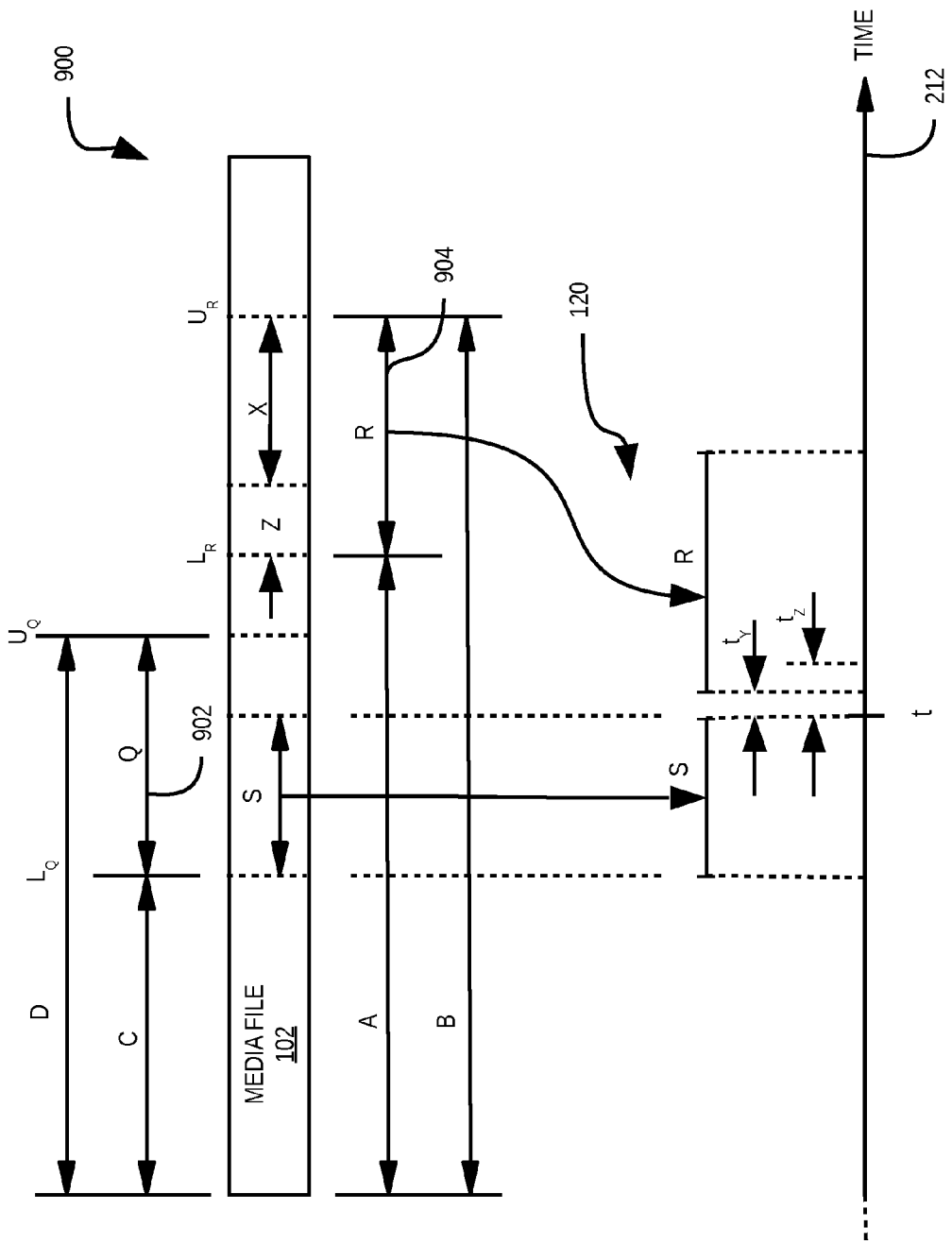
FIG. 9 shows a timeline of a requested chunk forward in the media file being streamed from the server to the client device shown in FIG. 1.
Figure 10:
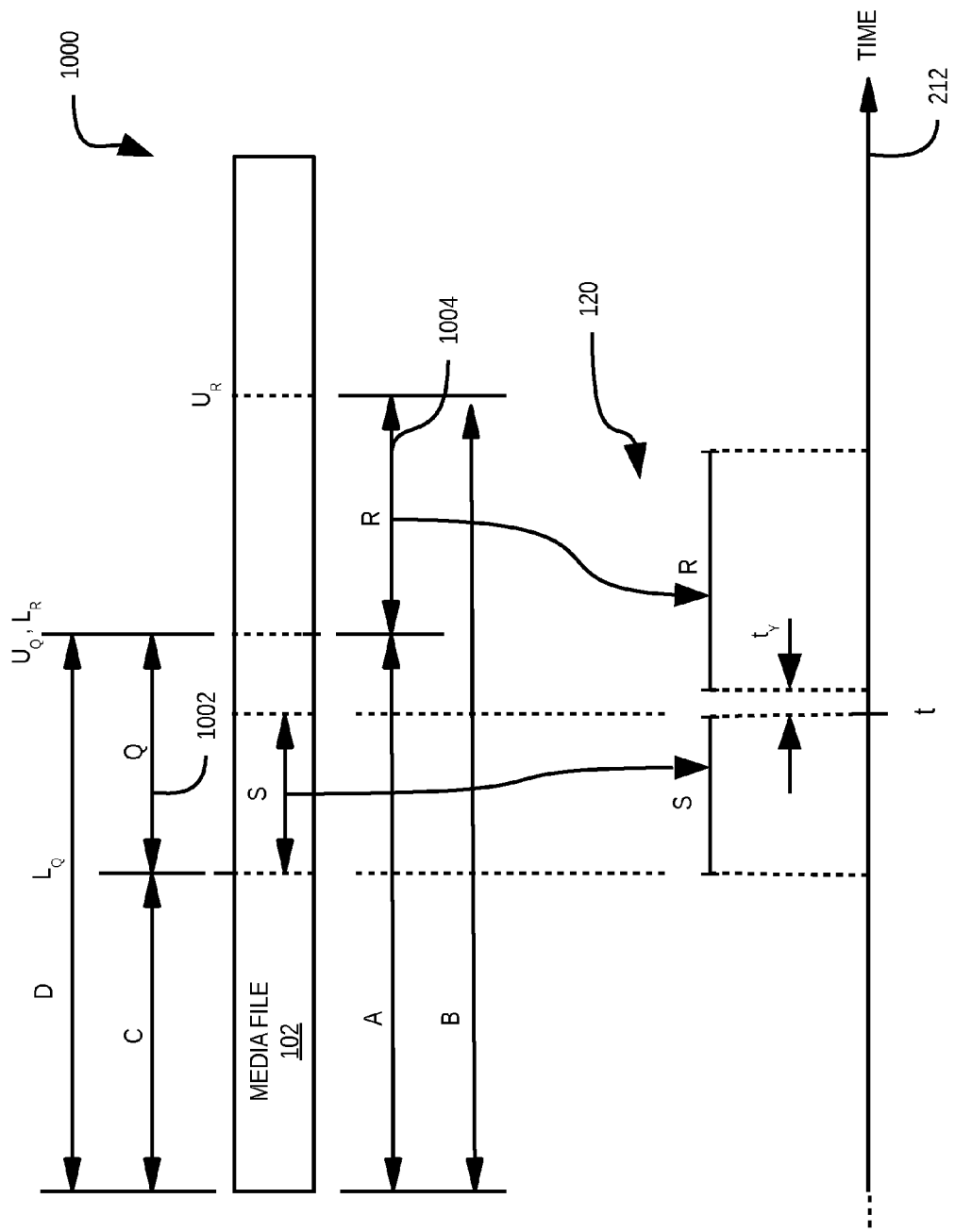
FIG. 10 shows a timeline of a logical successor requested chunk being streamed from the server to the client device shown in FIG. 1.
Figure 11:
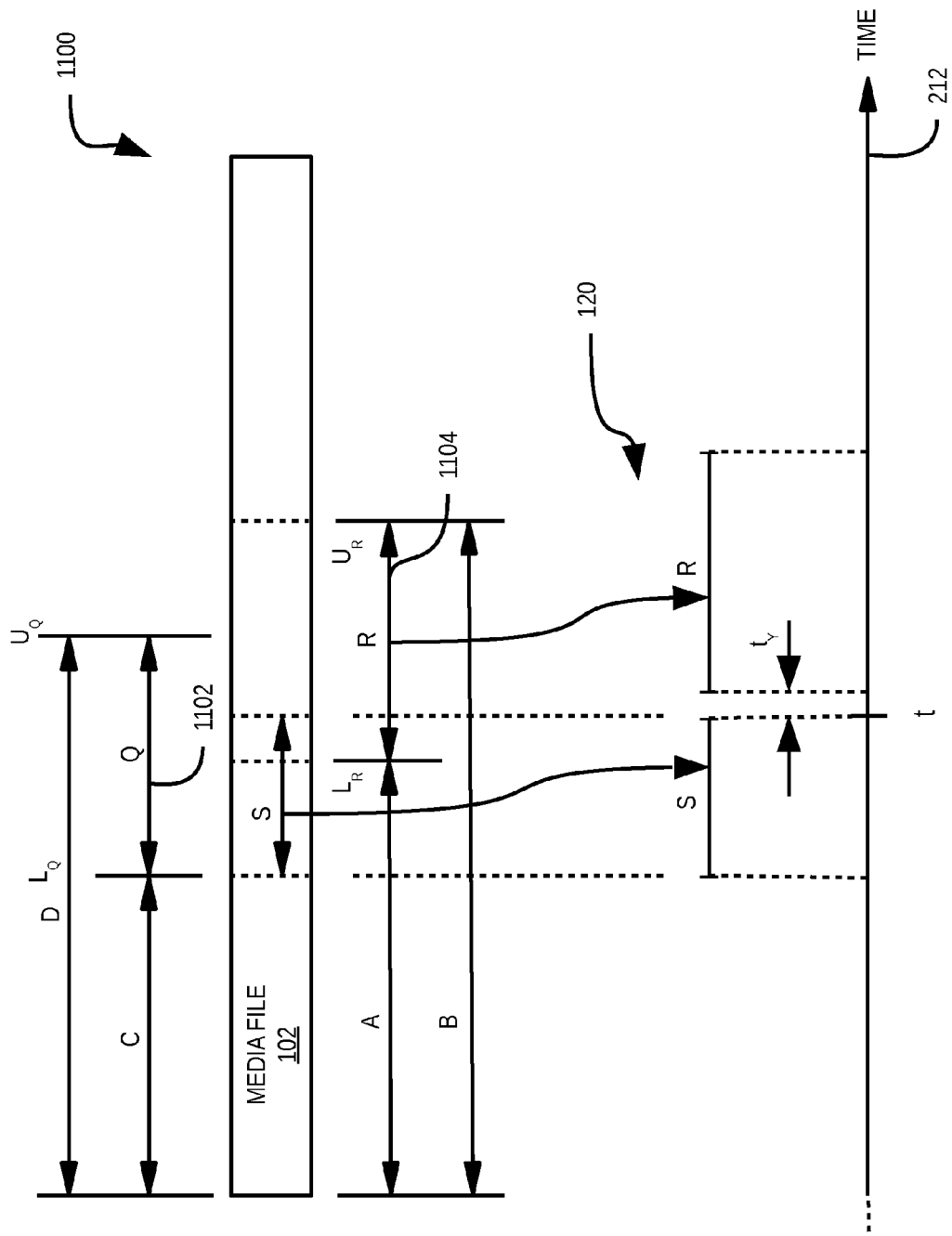
FIG. 11 shows a timeline of a requested chunk that overlaps with a current chunk being streamed from the server to the client device shown in FIG. 1.
Figure 12:
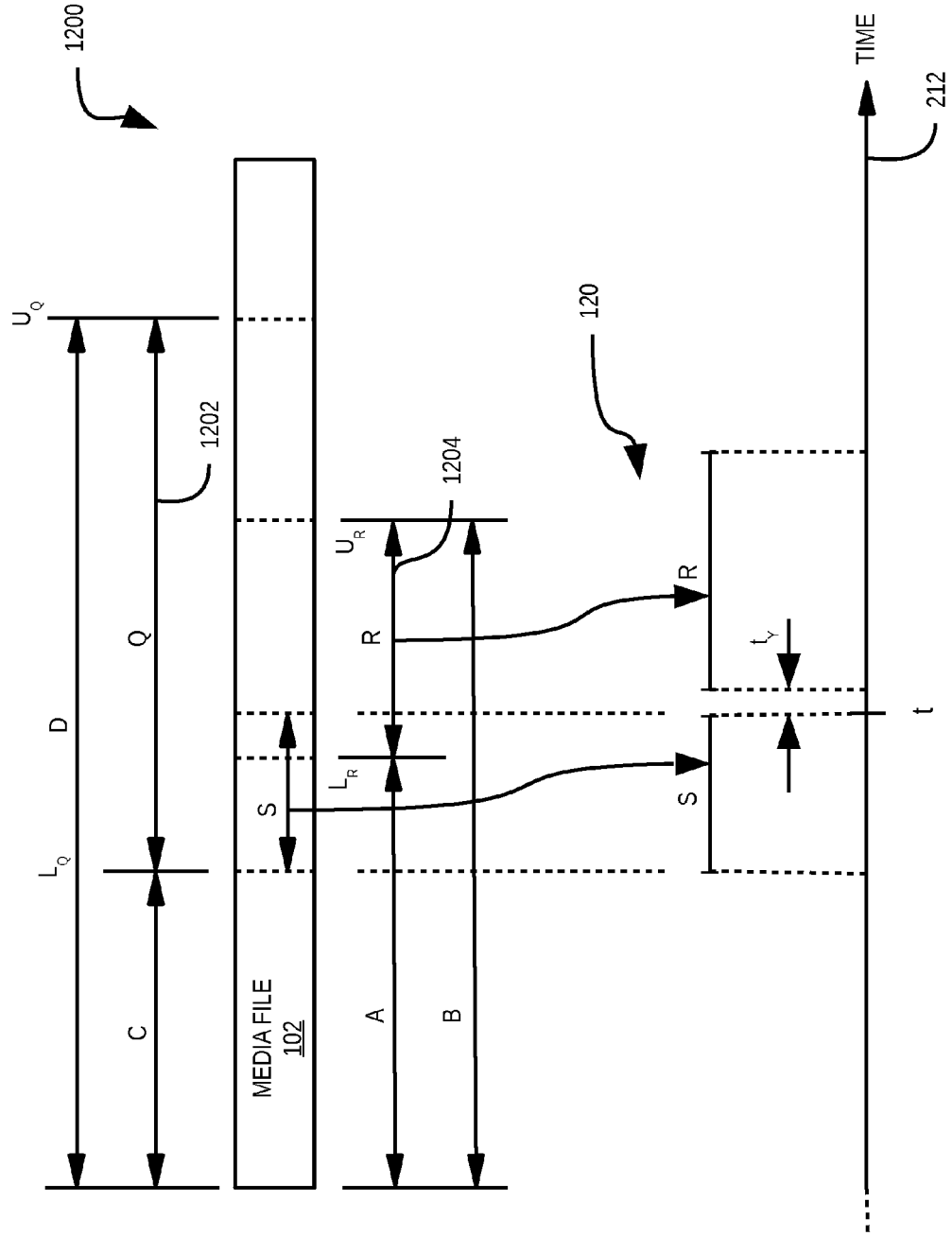
FIG. 12 shows a timeline of a requested chunk that overlaps with an ongoing chunk being streamed from the server to the client device shown in FIG. 1.

Each of the requested chunks 118 is characterized by a type of the seek request, which may be, for example, an entire file as described in detail below with reference to FIG. 7 is a seek wherein the requested chunk 704 includes all of the media file 102 from a beginning to an end, a back in media file seek as described in detail below with reference to FIG. 8 is a seek wherein the requested chunk 804 is a chunk that is back in the media file 102 with respect to a current chunk 802 that is currently being streamed, a forward in media file seek as described in detail below with reference to FIG. 9 is a seek wherein the requested chunk 904 is a chunk that is forward in the media file 102 with respect to a current chunk 902 that is currently being streamed, a logical successor seek as described in detail below with reference to FIG. 10 is a seek wherein the requested chunk 1004 is a chunk that is a logical successor in the media file 102 to a current chunk 1002 that is currently being streamed, a previous data sent overlap seek as described in detail below with reference to FIG. 11 is a seek wherein the requested chunk 1104 is a chunk that overlaps data sent from a current chunk 1102 that is currently being streamed in the media file 102, or an ongoing data sent overlap seek as described in detail below with reference to FIG. 12 is a seek wherein the requested chunk 1204 is a chunk that overlaps data sent from a ongoing chunk 1202 that is currently being streamed in the media file 102.

In general, it is advantageous to stream 120 the requested chunks 118 from the HTTP proxy server 108 to the client device 105 at the throttled rate as much as possible without any undesirable effects noticed by the user since the user may at any time move the slider and any chunks that might have been previously streamed but not yet played would constitute wasted bandwidth. At other times, as described in detail below, it may be advantageous to stream 120 the requested chunk 118, or a portion thereof, from the HTTP proxy server 108 to the client device 105 at the burst rate for a predetermined burst duration in order to mitigate the undesirable effects, such as latency.

Figure 2:
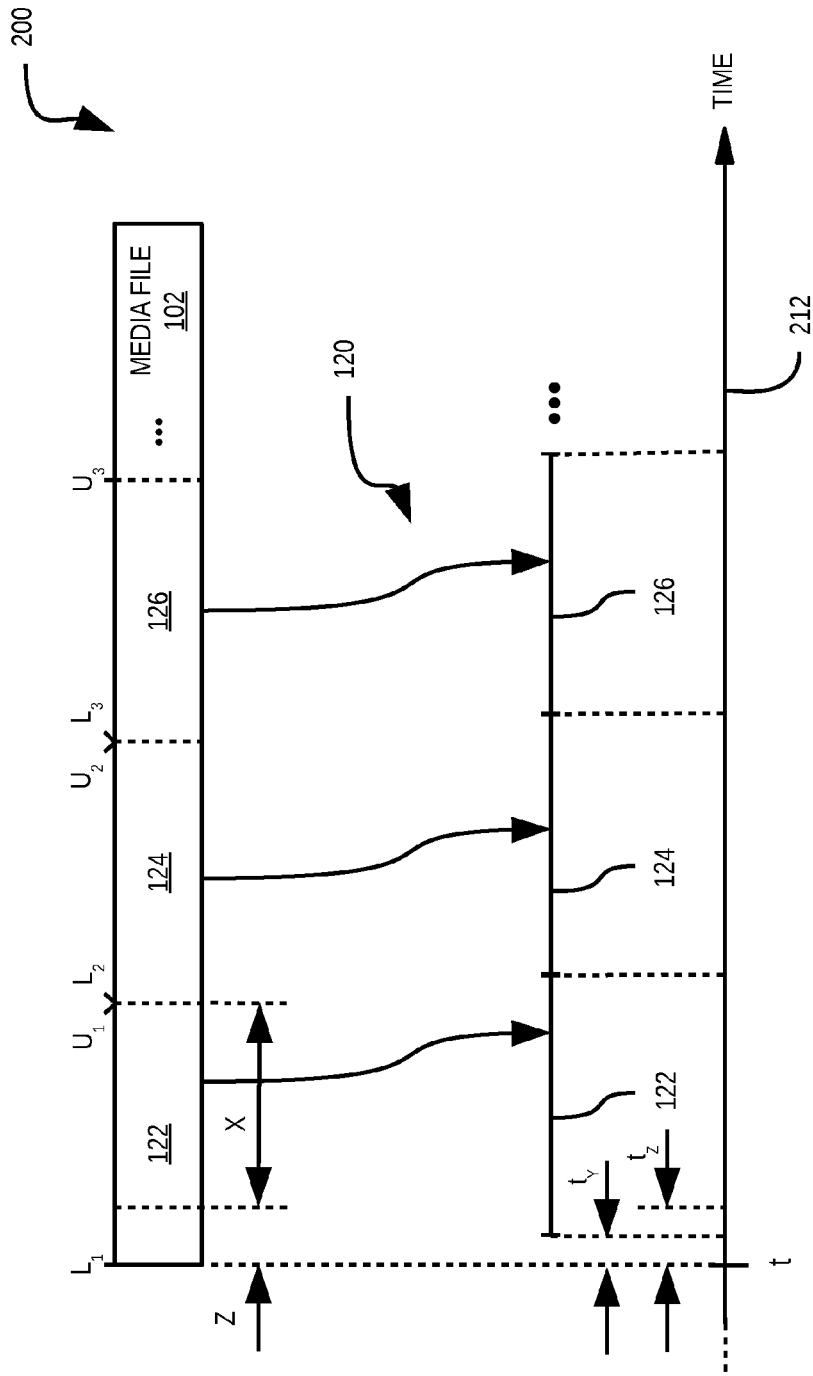
FIG. 2 shows a timeline of sequential chunks of the media file being streamed from the server to the client device shown in FIG. 1.

Referring to FIG. 2 there is shown an example of a mapping 200 of the requested chunks 122,124,126 shown in FIG. 1 on a timeline 212 representing streaming 120 of the requested chunks 122,124,126 from the HTTP proxy server 108 to the client device 105 and playing the requested chunks 122,124, 126 on the media player 106. In this example, the requested chunks 122,124,126 are sequential chunks at the beginning of the media file 102. However, in general, the requested chunks 118 may be from anywhere in the media file 102 and in any order, not necessarily sequential. In this example, the first requested chunk 122 is played on the player 106 after a latency time $t_Y$. A portion of the first requested chunk 122 is streamed at the burst rate for a predetermined burst duration $t_Z$. Thereafter a remaining part X of the requested chunk 122 is streamed 120 at the throttle rate. Subsequent chunks 124, 126 are streamed 120 at the throttle rate.

Figure 3:
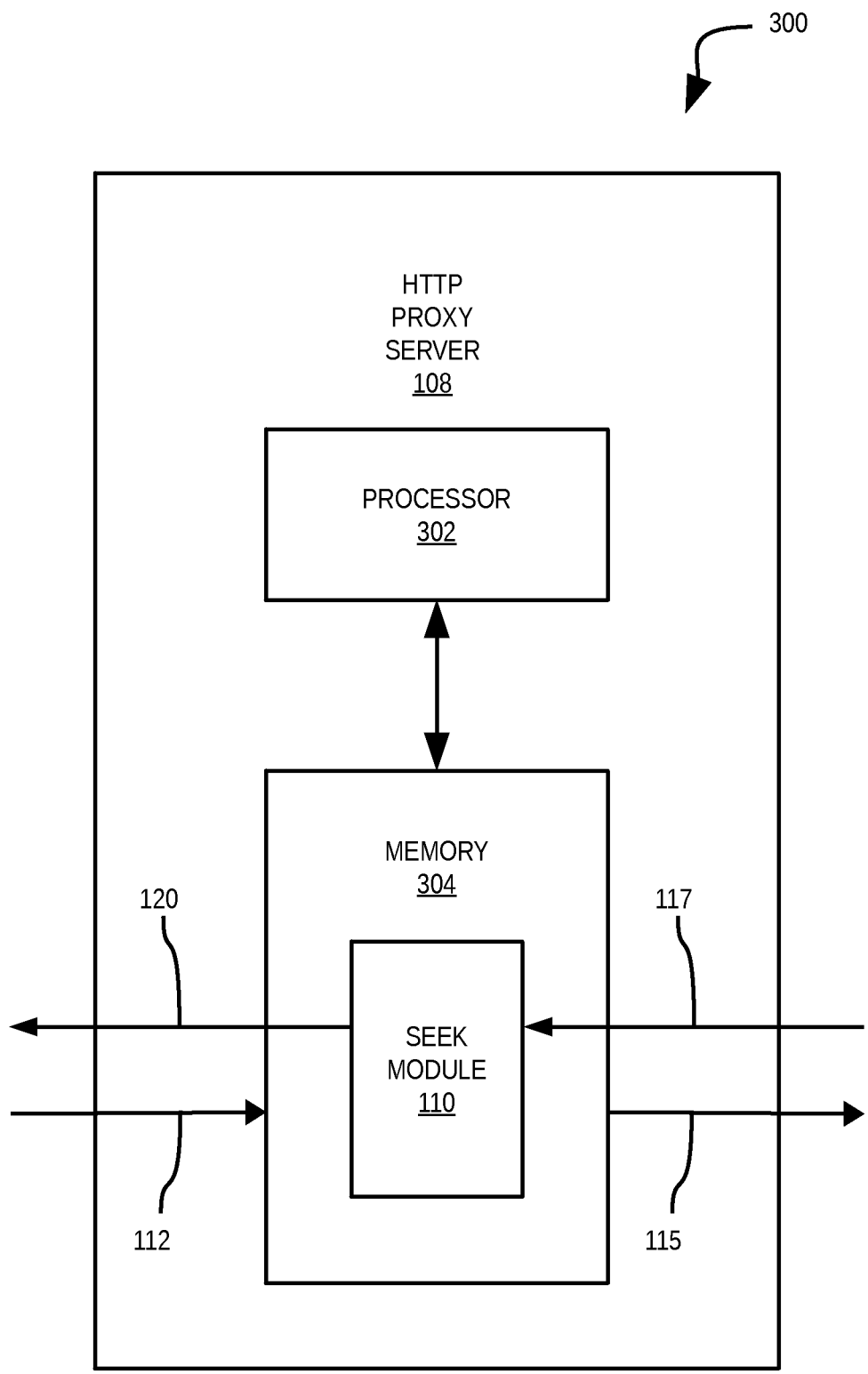
FIG. 3 shows a block diagram of a HTTP (Hyper-Text Transport Protocol) server shown in FIG. 1.

Referring to FIG. 3 there is shown a block diagram 300 of the HTTP proxy server 108. The HTTP proxy server 108 preferably includes a conventional processor 302 and memory 304. The seek module 110 resides in the memory 304.

The seek module 110 includes computer readable instructions stored in the memory 304 which may be, for example, a non-transitory computer readable storage medium, such as Ram (Random Access Memory), DVD (Digital Video Disk), CD-ROM (Compact Disk Read Only Memory) or the like, for execution by the processor 302, for executing steps of the method of the embodiments of the present invention as will be described in detail below.

Figure 4:
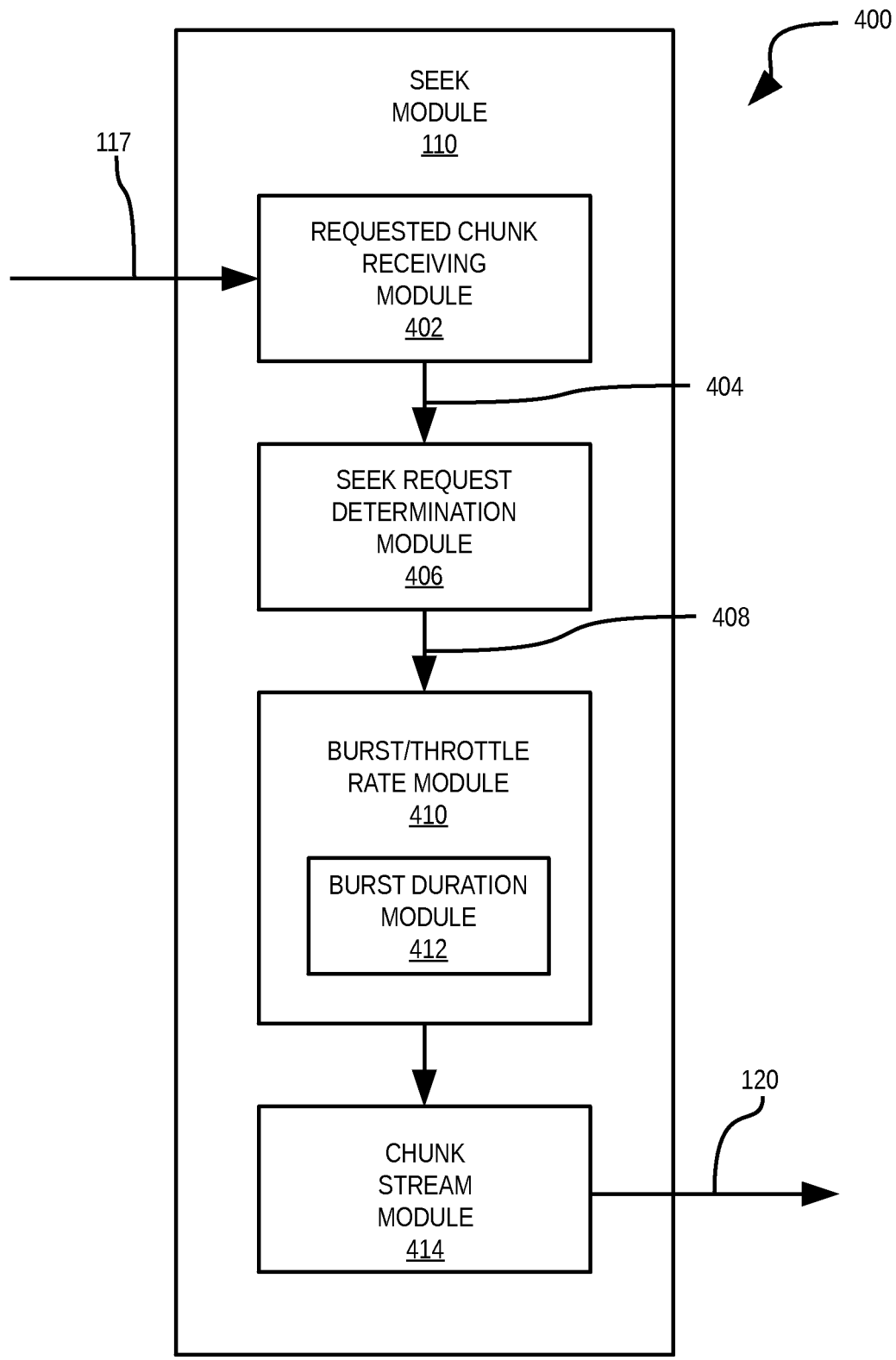
FIG. 4 shows a block diagram of a seek module shown in FIG. 3.

In FIG. 4 there is shown a block diagram 400 of the seek module 110. The seek module 110 includes a Requested Chunk Receiving Module 402 for receiving the requested chunks 118 from the server computer 104. The Requested Chunk Receiving Module 402 passes 404 the requested chunks 118 to a Seek Request Determination Module 406 to determine the type of the seek request. The Seek Request Determination Module 406 passes the requested chunks 118 to a Burst/Throttle Rate Module 410.

The Burst/Throttle Rate Module 410 determines the rate of streaming 120 of the requested chunks 118 from the HTTP proxy server 108 to the client device 105. The Burst/Throttle Rate Module 410 includes a Burst Rate Duration Module 412 for determining the duration $t_Z$ of streaming 120 the requested chunks 118 or portions thereof at the burst rate. The burst duration $t_Z$ may be determined by experimentation or calculated from the header of the media file 102. In some preferred embodiments of the invention, a typical value for the burst duration $t_Z$ may be from a few msec. to a few sec., for example from a few msec. to 5 sec. Still, in other preferred embodiments a typical value for the burst duration $t_Z$ may be from a few msec. to 10 sec. More preferably, a typical value for the burst duration $t_Z$ may be from a few msec. to 2 to 3 sec. A media bitrate is the rate at which the client device 105 plays the media file 102 on the player. The throttling rate is usually higher than the media bitrate to ensure that the client device receives data slightly faster than real time so that the player buffer is filled enough to handle intermittent connection speeds.

A burst factor is a ratio of the burst rate to the throttle rate. In some preferred embodiments a typical range of the value of the burst ratio is from about 2 to about 5. In other preferred embodiments a typical range of the value of the burst ratio is 5 to 10. For example, if the throttle rate is chosen to be 360 kbit/sec., and the burst ratio is chosen to be 3.5, then the burst rate would be 1260 kbit/sec. Then if the burst duration $t_Z$ is chosen to be 4 sec., the total amount of data transferred will be 5040 kbits or 645120 bytes.

The burst duration and burst factor are configuration parameters that may be adjusted. Default values for these parameters are usually determined empirically to deliver the best user experience for the most common use case. The burst rate is the determined by multiplying the burst factor by the media bitrate.

The burst factor and burst duration may be also dynamically determined based on the file header containing file size, so that the burst factor and/or burst duration is longer for larger file sizes.

The Burst/Throttle Rate Module 410 passes the requested chunks 118 to a Chunk Streaming Module 414. The Chunk Streaming Module 414 streams 120 the requested chunks 118 from the HTTP proxy server 108 to the client device 105 at the rate and duration determined by the Burst/Throttle Rate Module 410.

Figure 5:
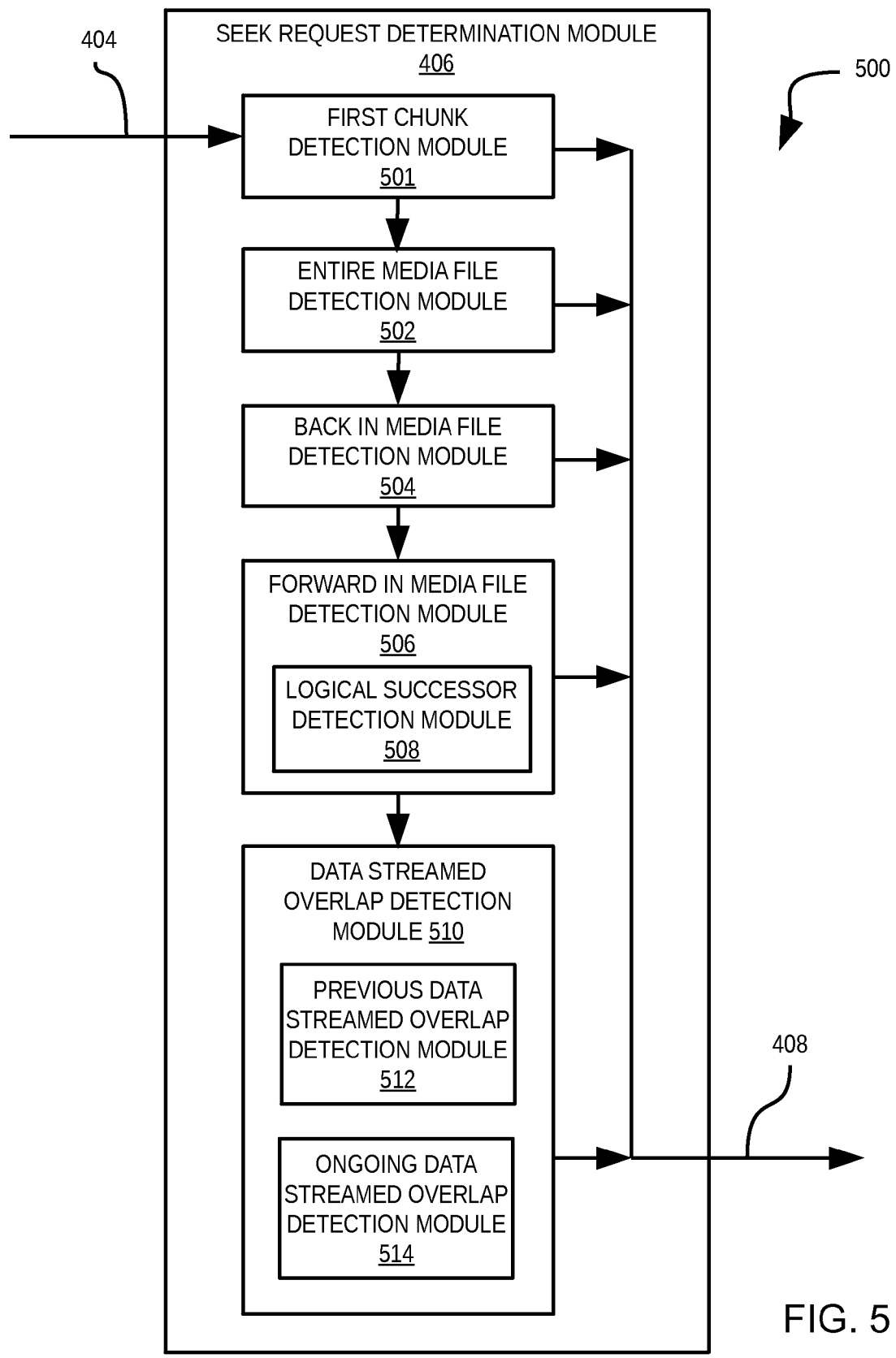
FIG. 5 shows a block diagram of a seek request determination module shown in FIG. 4.

Referring to FIG. 5 there is shown a block diagram 500 of the Seek Request Determination Module 406 shown in FIG. 4. The Seek Request Determination Module 406 receives 404 the requested chunks 118 from the Requested Chunk Receiving Module 402 and determines a type of the seek request characterizing each of the requested chunks 118.

A First Chunk Detection Module 501 determines if the requested chunk 118 is characterized by being the first chunk to be streamed to the client device 105. As shown in FIG. 2, there is no chunk from the media file 102 that has been previously streamed to the client device 105 when the first requested chunk 122 is received by the Request Chunk Receiving Module 402 (time=t).

An Entire File Detection Module 502 determines if the requested chunk 118 is characterized by an entire file seek request as described in detail herein below with reference to FIG. 7.

A Back In Media File Detection Module 504 determines if the requested chunk 118 is characterized by a back in media file seek request as described in detail herein below with reference to FIG. 8.

A Forward In Media File Detection Module 506 determines if the requested chunk 118 is characterized by a forward in media file seek request as described in detail herein below with reference to FIG. 9.

A Logical Successor In Media File Detection Module 508 determines if the requested chunk 118 is characterized by a logical successor in media file seek request as described in detail herein below with reference to FIG. 10.

A Data Streamed Overlap Detection Module 510 includes a Previous Data Streamed Overlap Detection Module 512 and an Ongoing Data Streamed Overlap Detection Module 514. The Previous data Streamed Overlap Detection Module 512 determines if the requested chunk 118 is characterized by previous data streamed overlapping with the requested chunk 118 as described in detail herein below with reference to FIG. 11. The Ongoing data Streamed Overlap Detection Module 514 determines if the requested chunk 118 is characterized by an ongoing data streamed overlapping with the requested chunk 118

Figure 6A:
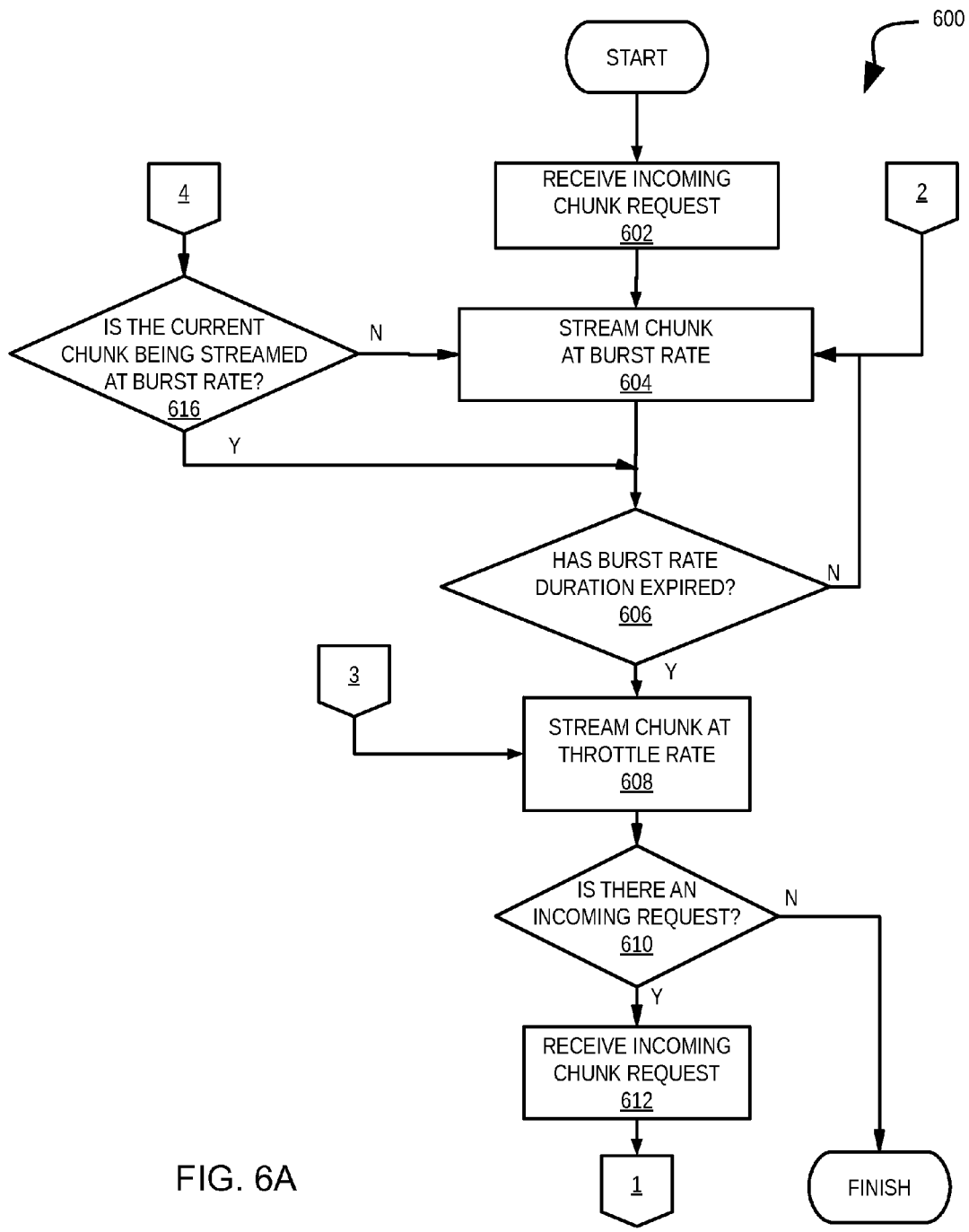
FIG. 6A shows a first part of a flowchart of a method for streaming the media file from the server computer to the client device shown in FIG. 1 according to an embodiment of the present invention.
Figure 6B:
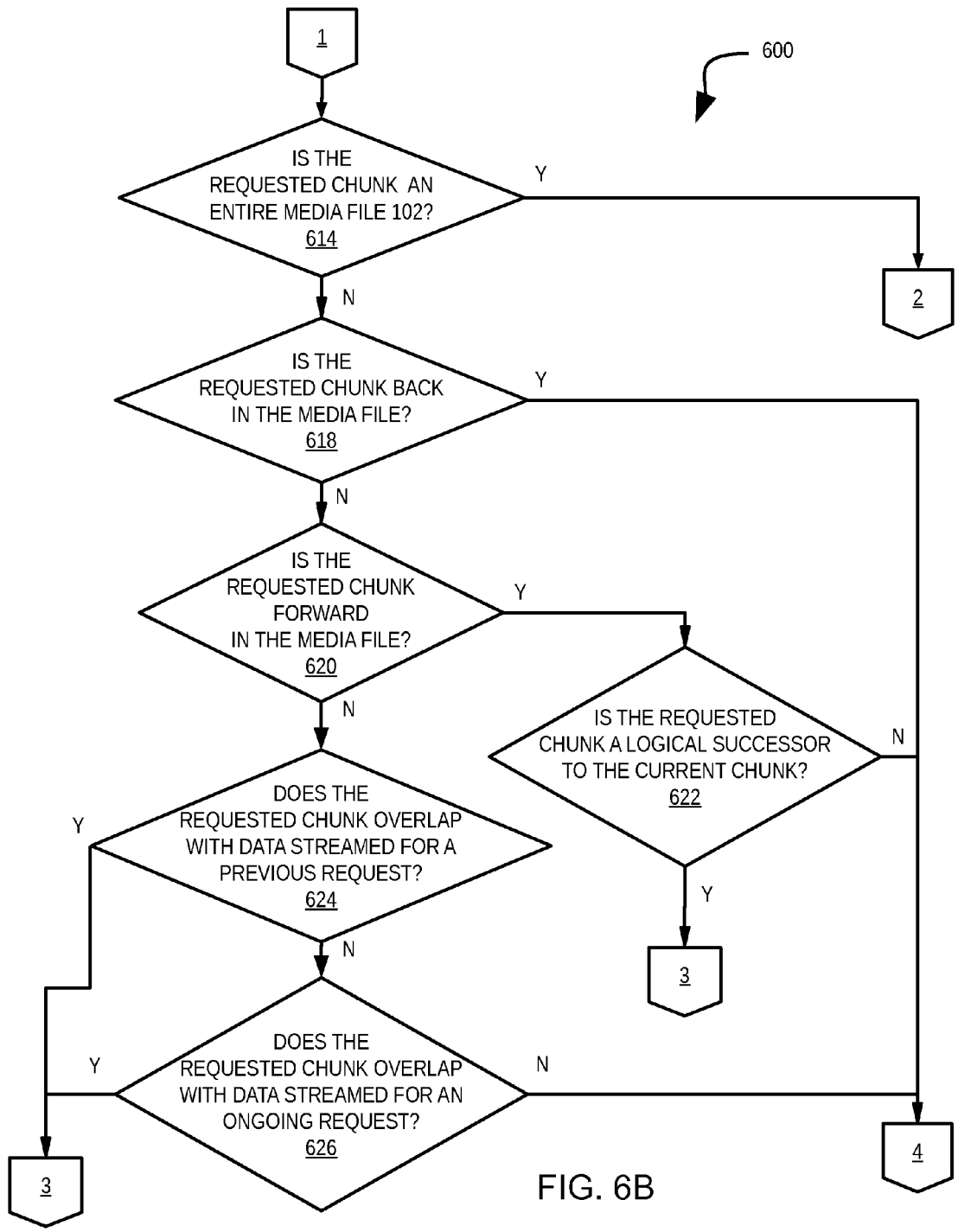
FIG. 6B shows a second part of the flowchart of the method for streaming the media file from the server computer to the client device shown in FIG. 6B.

Referring to FIGS. 6A and 6B there is shown a flowchart 600 of a method for streaming the media file 102 using the system 100 shown in FIG. 1. In FIG. 6A, inter sheet symbols 1,2,3,4 are to be interpreted as joining to respective inter sheet symbols 1,2,3,4 on FIG. 6B.

First, in Step 602, the Requested Chunk Receiving Module 402 receives the requested chunk 122 (see FIG. 2) from the client device 105. Typically, but not necessarily, the requested chunk 122 is a chunk of the media file 102 having zero offset ($L_1$=0) in the media file 102. The First Chunk Detection Module 501 detects if the requested chunk 122 is a first chunk from the media file, i.e. there are no previously streamed requested chunks currently being played on the player 106. Provided the requested chunk 122 is the first chunk from the media file 102, the Burst/Throttle Rate Module 410 determines that a first part (labeled Z on FIG. 2) of the requested chunk 122 is to be to be streamed 120 to the client device 105 at the burst rate, Step 604.

In Step 606, the first part of the requested chunk 122 is streamed to the client device 105 at the burst rate for at least a predetermined Burst Rate Duration determined by the Burst Duration Module 412. Thereafter, in Step 608, a remaining part (labeled X on FIG. 2) of the requested chunk 122 is streamed by the Chunk Stream Module 414 to the client device 105 at the throttle rate.

Next, in Step 610, the Requested Chunk Receiving Module Requested Chunk Receiving Module 402 determines if there is another requested chunk. Provided there is no incoming requested chunk, the method is finished, otherwise in Step 612, the Requested Chunk Receiving Module 402 receives the requested chunk. A time (t) when the requested chunk is received is shown on the timeline 212 in FIGS. 7 to 12. If there isn't another incoming request, then the method 600 is completed/terminated.

In Steps, 614,618,620,622,624 and 626 the Seek Request Determination Module 406 determines a type of seek characterizing the requested chunk. In FIGS. 7 to 12 a current chunk, a chunk currently being streamed from the HTTP proxy server 108 to the client device 105 at time=t, is denoted by labels 702,802,902,1002,1102,1202 respectively. In FIGS. 7 to 12 the requested chunk, a chunk received by the Requested Chunk Receiving Module 402 at time=t, is denoted by labels 704,804,904,1004,1104,1204 respectively.

In Step 614 the Entire Media File Detection Module 502 determines if the requested chunk 704 (FIG. 7) is an entire media file 102. The requested chunk 704 is the entire media file 102 provided a lower offset (A) of a range (R) of the requested chunk 704 is zero and an upper offset (B) of the requested chunk 704 is at an end of the media file 102. Regardless of a range (S) of the current chunk 702 being streamed at time t and provided the requested chunk 704 is the entire media file 102, a first part (denoted by Z) of the media file 102 is streamed 120 from the HTTP proxy server 108 to the client device 105 at the burst rate, Step 604. After the predetermined burst rate duration, Step 606, a remaining part (denoted by X) of the requested chunk 704 is streamed 120 from the HTTP proxy server 108 to the client device 105 at the throttled rate, Step 608. Execution then returns back to Step 610. Provided the requested chunk 704 is not an entire media file 102 execution proceeds to Step 618.

In Step 618 the Back In Media File Detection Module 504 determines if the requested chunk 804 (FIG. 8) is back in the media file 102. The requested chunk 804 is back in the media file 102 provided a lower offset (C) of a range (Q) of the current chunk 802 is greater than and an upper offset (B) of a range (R) of requested chunk 804. Provided the requested chunk 804 is back in the media file 102, execution proceeds to Step 616, otherwise execution proceeds to Step 620.

In Step 620 the Forward in Media File Detection Module 506 determines if the requested chunk 904 (FIG. 9) is forward in the media file 102. The requested chunk 904 is forward in the media file 102 provided an upper offset (D) of a range (Q) of the current chunk 902 is less than a lower offset (A) of a range (R) the requested chunk 904. Provided the requested chunk 904 is forward in the media file 102, execution proceeds to Step 622, otherwise execution proceeds to Step 624.

In Step 622 the Logical Successor in Media File Detection Module 508 determines if the requested chunk 1004 (FIG. 10) is a logical successor in the media file 102 to the current chunk 1002. The requested chunk 1004 is the logical successor in the media file 102 provided an upper offset (D) of a range (Q) of the current chunk 1002 is equal to a lower offset (A) of a range (R) of the requested chunk 904. Provided the requested chunk 1004 is a logical successor in the media file 102, execution proceeds to Step 608, otherwise execution proceeds to Step 616.

In Step 624 the Previous Data Streamed Overlap Detection Module 512 determines if the requested chunk 1104 (FIG. 11) overlaps with previous data streamed (denote by S) from the current chunk 1102. The requested chunk 1104 overlaps with previous data streamed from the current chunk 1102 provided a lower offset (A) of a range (R) of the requested chunk 1104 is less than a lower offset (C) of a range (D) plus a range of data streamed (S) from the current chunk 1102 and an upper offset (B) of a range (R) of the requested chunk 1104 is greater than an upper offset (D) of the current chunk 1102. Provided the requested chunk 1104 overlaps with the previous data streamed (S) from the current chunk 1102, execution proceeds to Step 608, otherwise execution proceeds to Step 626.

In Step 626 the Ongoing Data Streamed Overlap Detection Module 514 determines if the requested chunk 1204 (FIG. 12) overlaps with ongoing data streamed (denote by S) from the current chunk 1202. The requested chunk 1204 overlaps with ongoing data streamed from the current chunk 1202 provided a lower offset (A) of a range (R) of the requested chunk 1204 is less than a lower offset (C) of a range (Q) plus an amount of ongoing data streamed (S) from the current chunk 1202 and an upper offset (B) of a range (R) of the requested chunk 1204 is less than an upper offset (D) of the current chunk 1202. Provided the requested chunk 1204 overlaps with ongoing data streamed (S) from the current chunk 1102, execution proceeds to Step 608, otherwise execution proceeds to Step 616.

In Step 616, the Burst/Throttle Rate Module 410 determines if the current chunk 802,1002,1202 in Steps 618,622, 626 is being streamed 120 at the burst rate. Provided the current chunk 802,1002,1202 is being streamed at the burst rate, execution is returned to Step 606, otherwise execution is returned to Step 604.

In general, provided a range of the requested chunk 1104, 1204 overlaps with data from a current chunk 1102,1202 being streamed to the client device 105 (as shown in FIGS. 11 and 12, for example) or the range of the requested chunk 1004 is a logical successor to the current chunk 1002 (as shown in FIG. 10, for example), the requested chunk is streamed to the client device 105 at the throttled rate. Provided a range of the requested chunk 704,804,904 is the entirety of the media file 102 or back in the media file 102 or forward in the media file 102 (as shown in FIGS. 7, 8, and 9, for example), the first part (Z) of the requested chunk 704,804,904 is streamed to the client device 105 at the burst rate for at least a predetermined burst duration $t_Z$, and thereafter the remaining part (X) of the requested chunk 704,804,904 is streamed to the client device 105 at the throttled rate. Advantageously, streaming the first part (Z) the requested chunk 704,804,904 at the burst rate for at least the predetermined burst duration $t_Z$ mitigates the latency problem. Furthermore, streaming remaining part (X) of the requested chunk 704,804,904 at the throttled rate reduces wasted bandwidth. A size of the first part (Z) is equal to the burst rate times the burst duration $t_Z$.

Figure 13:
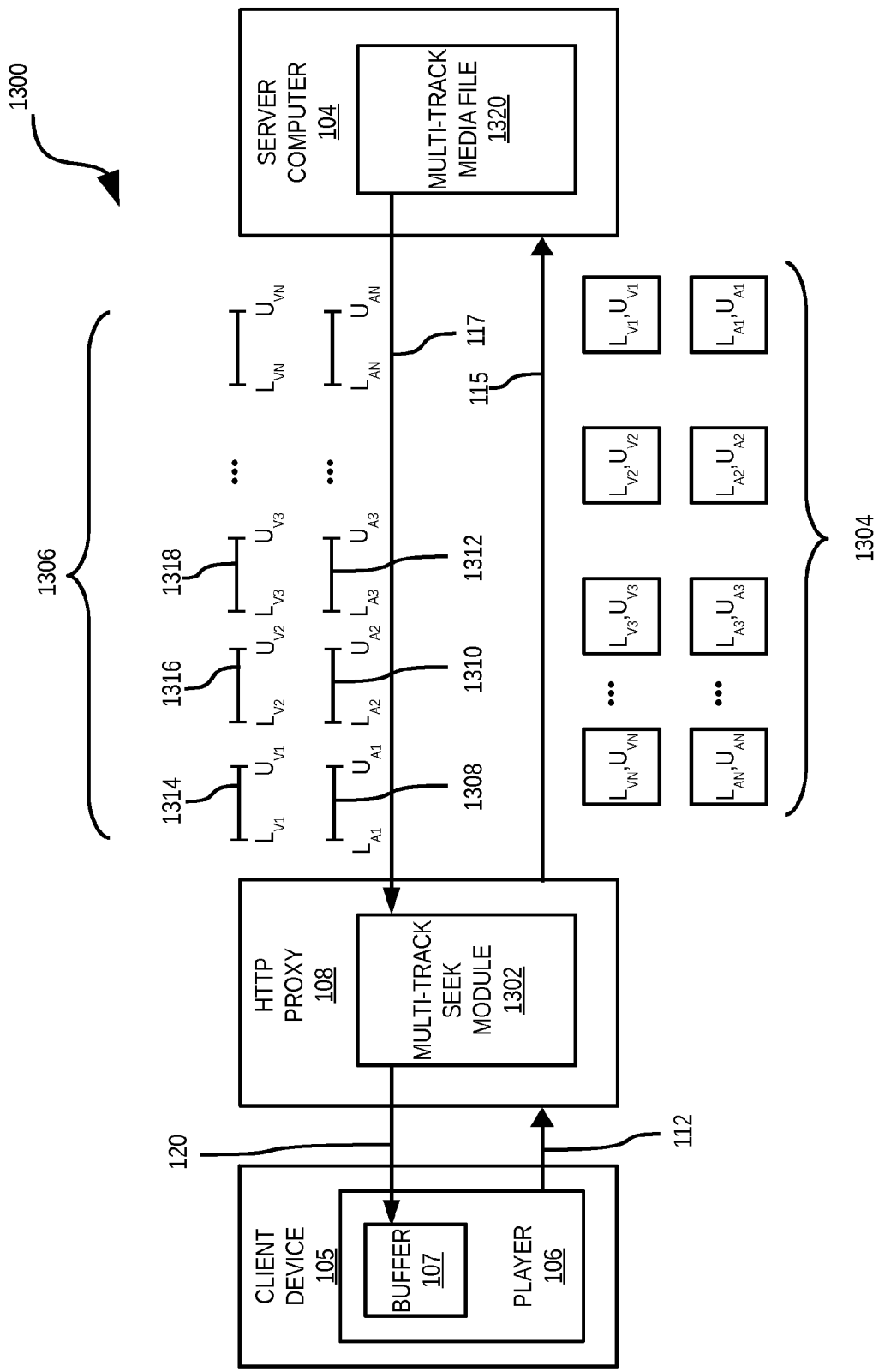
FIG. 13 shows a system configured to stream a multi-track media file from a server computer to a client device according to another embodiment of the present invention.

Referring to FIG. 13 there is shown a system 1300 another embodiment of the present invention. The system 1300 shown in FIG. 13 is similar to the system shown in FIG. 1 except that the system 1300 shown in FIG. 13 is configured to stream a multi-track media file 1320 from the server computer 104 to the client device 105. For example, the multi-track media file may include an audio track and a video track. The system 1300 preferably uses MPEG-DASH (Motion Picture Expert Group-Dynamic Adaptive Streaming over HTTP) protocol for streaming 120 the multi-track media file 1320 from the HTTP proxy server 108 to the client device 105 or alternatively HLS (HTTP Live Streaming) protocol may be used. Chunk requests 1304 are sent 115 to the server computer 104 for requested chunks 1306 that are sent 117 to the multi-track seek module 1302 in a HTTP proxy 108 in a manner similar to the system 100 shown in FIG. 1.

Figure 14:
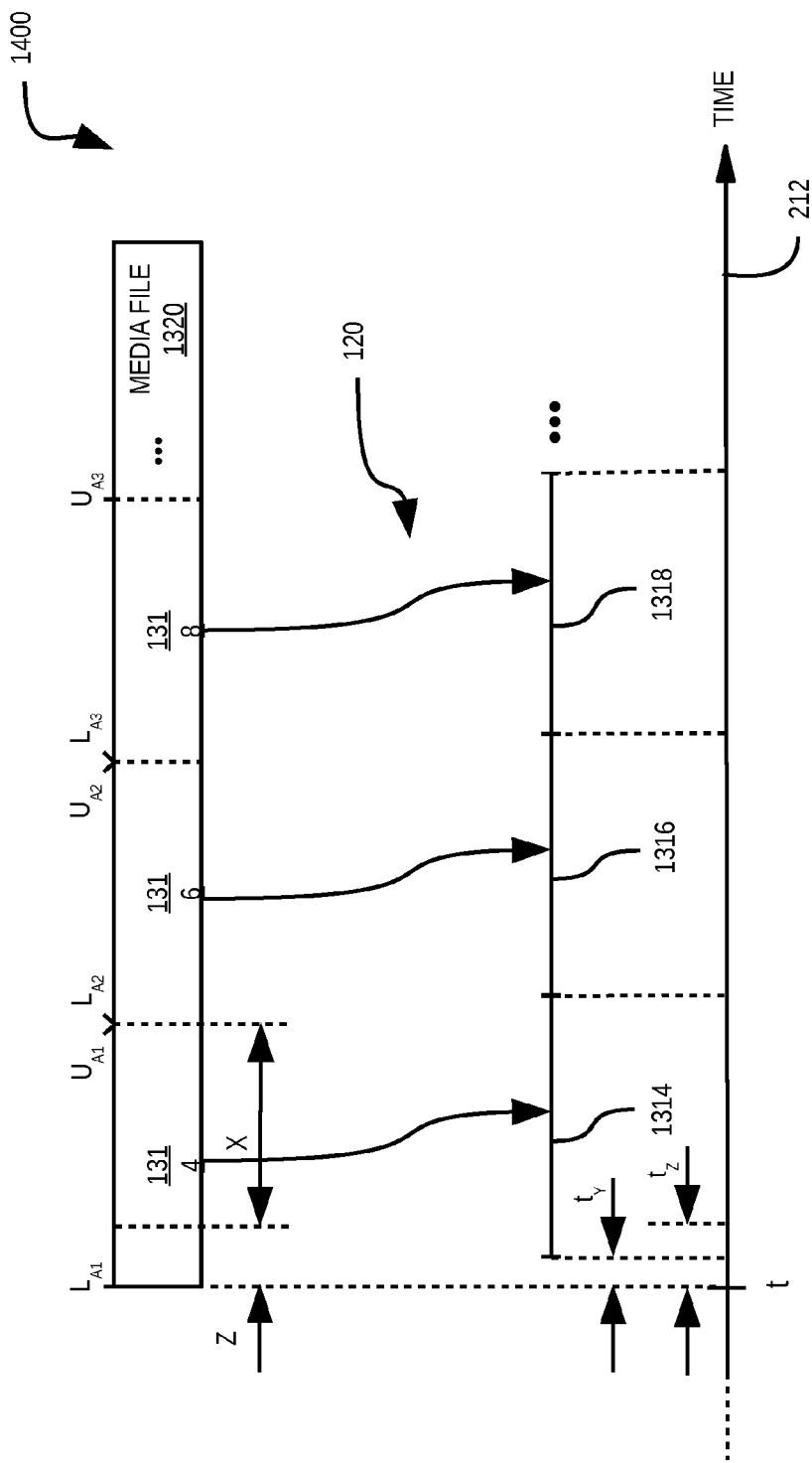
FIG. 14 shows a timeline of sequential chunks of an audio track of the multi-track media file being streamed from the server computer to the client device shown in FIG. 13.

Referring to FIG. 14, there is shown an example of a mapping 1400 of sequential requested chunks 1314,1316, 1318 from the audio track of the media file 1320. The requested chunks 1314,1316,1318 are streamed 120 in a similar manner to the requested chunks 122,124,126 shown in FIG. 2.

Figure 15:
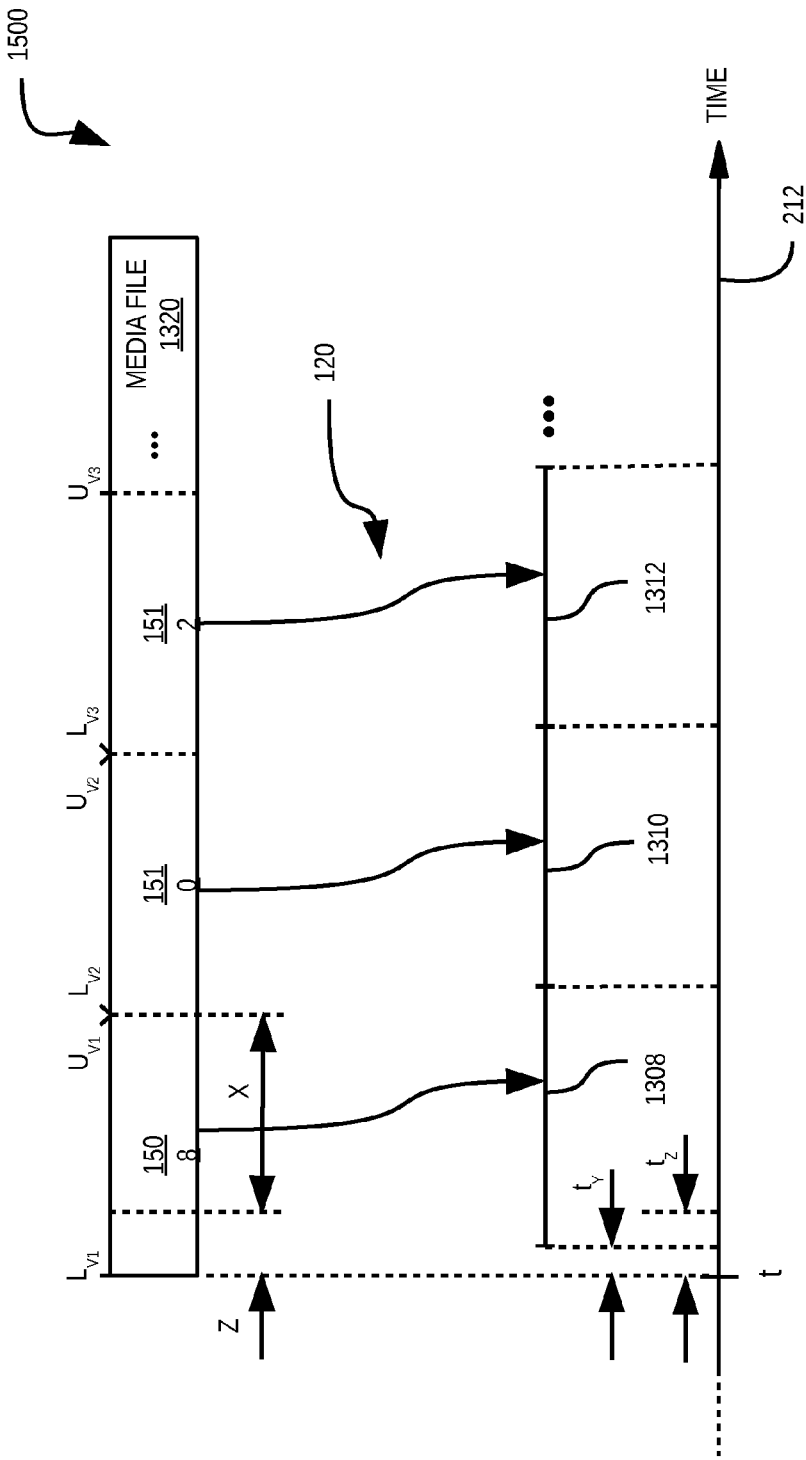
FIG. 15 shows a timeline of sequential chunks of a video track of the multi-track media file being streamed from the server computer to the client device shown in FIG. 13.

Referring to FIG. 15, there is shown an example of a mapping 1500 of sequential requested chunks 1508,1510, 1512 from the video track of the media file 1320. The requested chunks 1508,1510,1512 are streamed 120 in a similar manner to the requested chunks 122,124,126 shown in FIG. 2.

Figure 16:
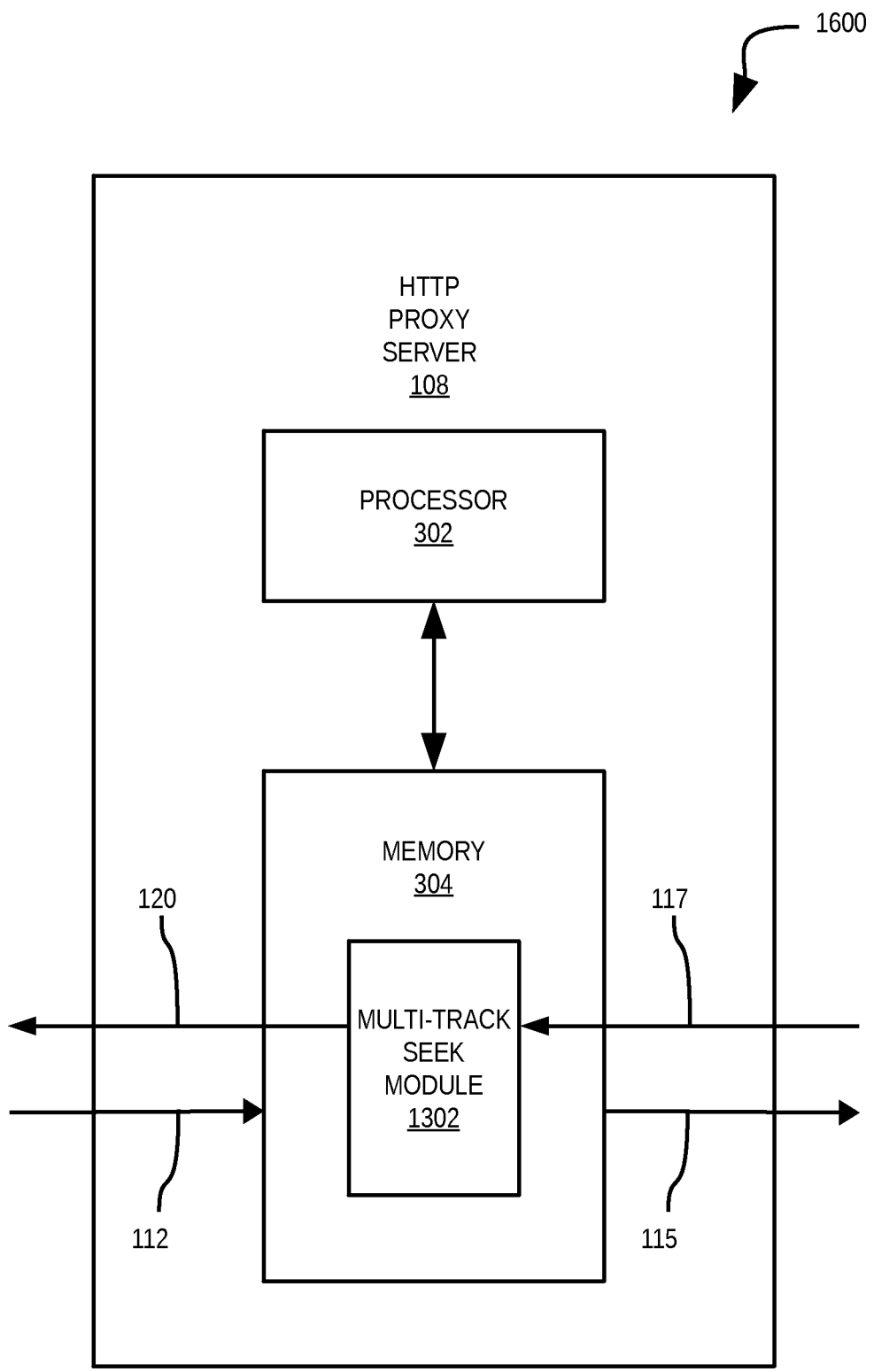
FIG. 16 shows a block diagram of an HTTP proxy server shown in FIG. 15.

Referring to FIG. 16 there is shown a block diagram 1600 of the HTTP proxy server 108 shown in FIG. 13. The HTTP proxy server 108 similar to the HTTP proxy server 108 shown in FIG. 13 except that the Seek Module 110 is replaced by a Multi-track Seek Module 1302. The Multi-Track Seek Module 1302 works in a similar manner to the Seek Module 110 described herein above but is further configured to receive the requested chunks 1314,1316,1318 from the audio track of the media file 1320 and the requested chunks 1508,1510,1512 from the video track of the media file 1320 asynchronously from each other. Furthermore, the Multi-Track Seek Module 1302 is configured to stream 120 the requested chunks 1314, 1316,1318 from the audio track of the media file 1320 and the requested chunks 1508,1510,1512 from the video track of the media file 1320 from the HTTP proxy server 108 to the client device 105 synchronously to each other.

Figure 17:
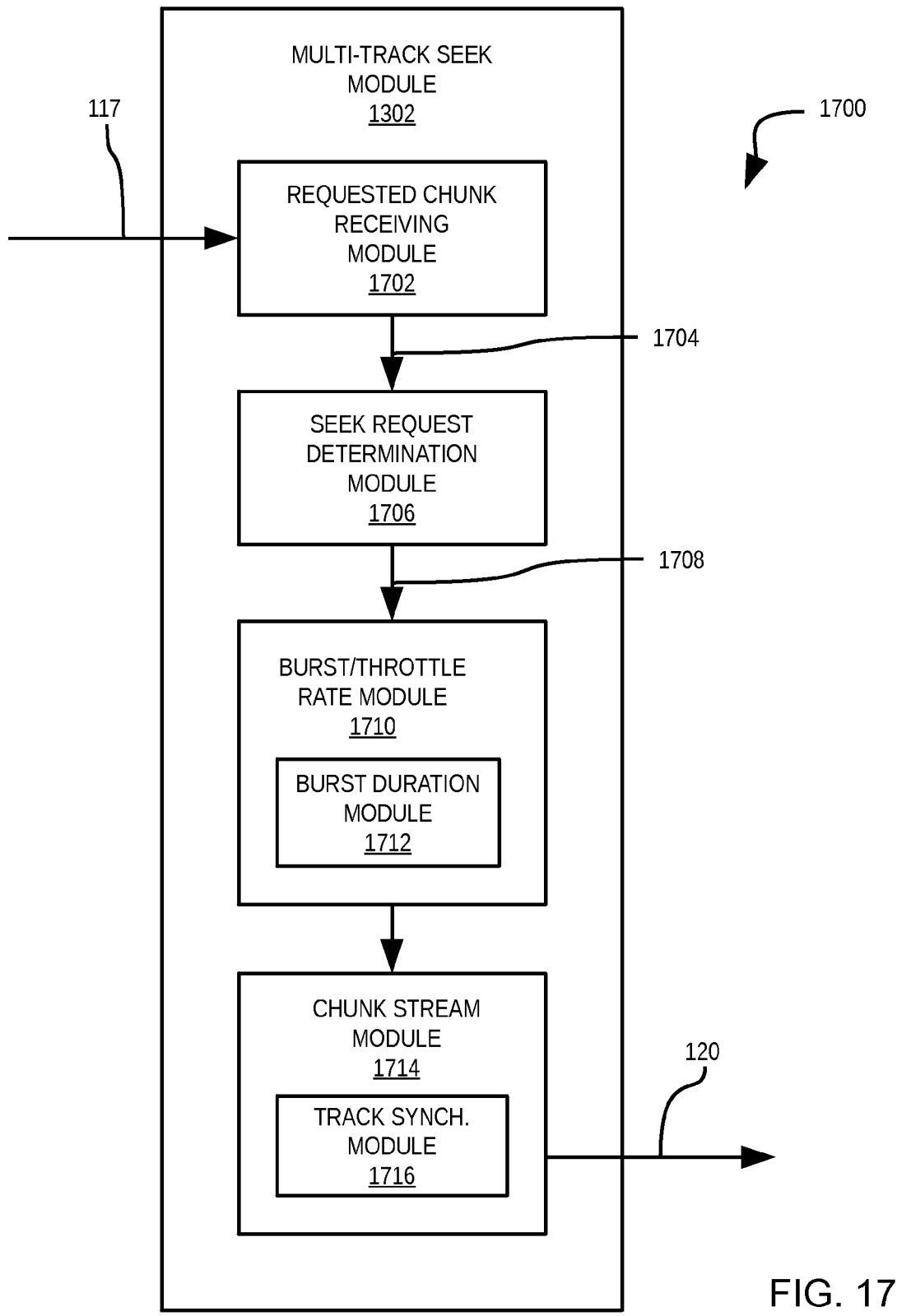
FIG. 17 shows a block diagram of a multi-track seek module shown in FIG. 15.

Referring to FIG. 17, there is shown a block diagram 1700 of the Multi-track Seek Module 1302 shown in FIG. 16. The modules included in the Multi-track Seek Module 1302 are similar to the corresponding modules in the Seek Module 110 shown in FIG. 4 except that a Chunk Stream module 1174 includes a Track Synchronization Module 1716 for synchronizing the requested chunks 1314,1316,1318 from the audio track of the media file 1320 and the requested chunks 1508, 1510,1512 from the video track of the media file 1320 when streaming 120 to the client device 105.

Figure 18:
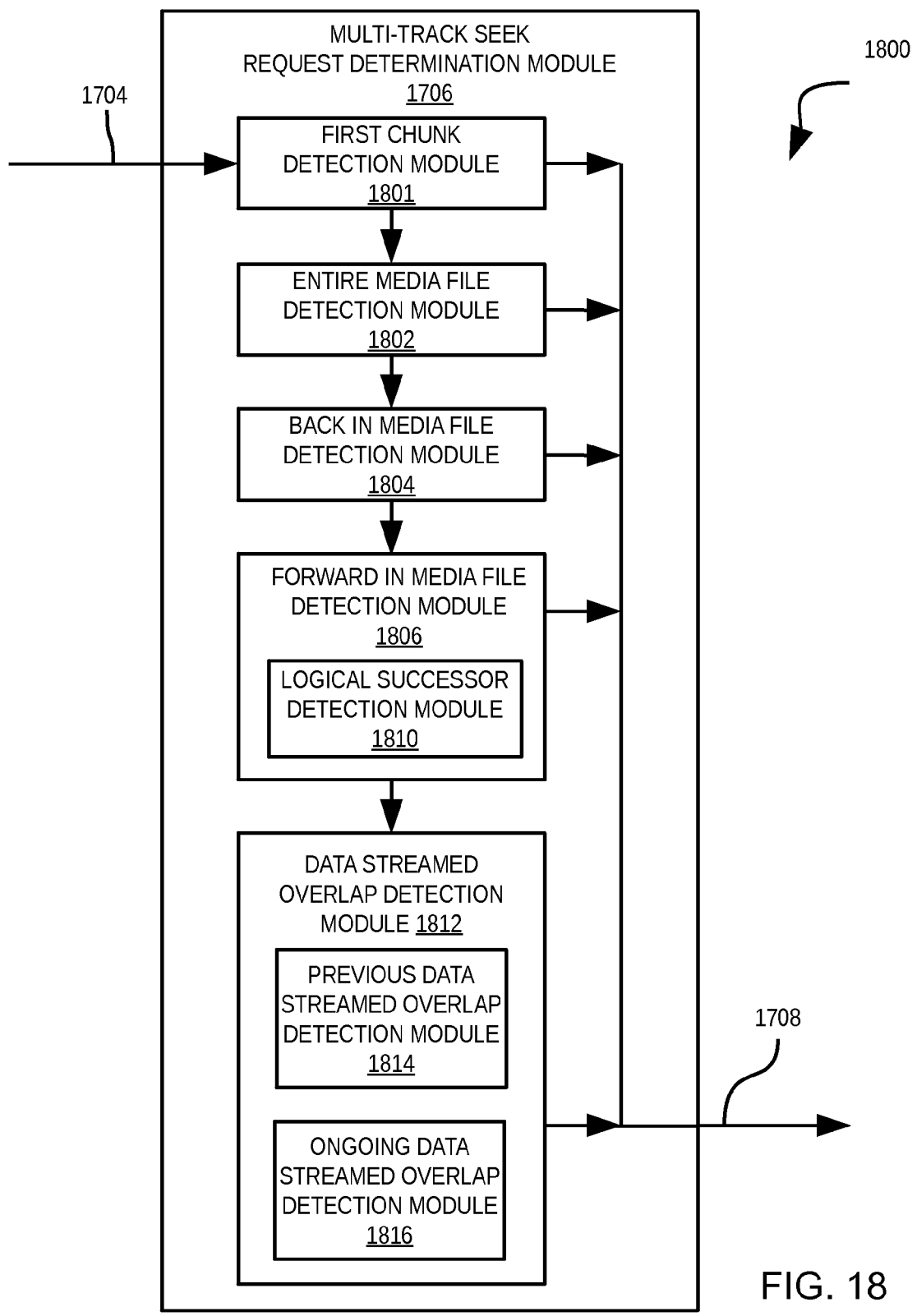
FIG. 18 shows a block diagram of a multi-track seek request determination module shown in FIG. 17.

Referring to FIG. 18, there is shown a block diagram 1800 of the Multi-Track Seek Request Detection Module 1706 shown in FIG. 17. The Multi-Track Seek Request Detection Module 1706 is similar to the Seek Request Determination Module 406 except that the Multi-Track Seek Request Detection Module 1706 is further configured to determine seek requests of multi-track files as described above with reference to FIGS. 13-14.

Embodiments of the present invention as described herein above, provide a system and method for streaming a media file from a server to a client device that reduces latency and saves bandwidth.

It is also understood that even though systems and methods according to the present invention are described using a procedural style flowchart (FIGS. 6A and 6B), other embodiments of the present invention may be realized using other techniques known in the art such as structured programming, object oriented programming or artificial intelligence methods.

Although specific embodiments of the present invention have been described in detail, it will be apparent to one skilled in the art that variations and modifications to the embodiments may be made within the scope of the following claims.

What is claimed is:

1. A method for streaming a media file from a server computer to a client device, the method comprising:
   using at least one hardware processor for:
   (a) receiving a requested chunk of the media file from the server computer;
   (b) provided one or more of the following conditions are met:
      (i) a range of the requested chunk overlaps with data from a current chunk streamed to the client device;
      (ii) the requested chunk is a logical successor to the current chunk;
   streaming the requested chunk to the client device at a throttled rate; and
   (c) otherwise, streaming the requested chunk to the client device at a burst rate for at least a predetermined burst duration, wherein the burst rate is equal to a burst factor times the throttle rate, and a value of the burst factor is from about 2 to about 10.

2. The method of claim 1 wherein a value of the predetermined burst duration is chosen from a range from about 1 msec. to about 10 sec.

3. The method of claim 1, further comprising streaming a remaining part of the requested chunk to the client device at the throttled rate after the predetermined burst duration.

4. The method of claim 1, wherein the step (c) further comprises streaming the requested chunk at the burst rate provided the range of the requested chunk precedes in the media file with respect to the current chunk.

5. The method of claim 1, wherein the step (c) further comprises streaming the requested chunk at the burst rate provided the range of the requested chunk includes an entire media file.

6. The method of claim 1 wherein a type of protocol used for streaming the media file from the server to the client device is chosen from a list consisting of HTTP (Hyper-Text Transfer Protocol), HTTPS (HTTP Secure), Bluetooth, MPEG-DASH (Motion Picture Expert Group-Dynamic Adaptive Streaming over HTTP) and HLS (HTTP Live Streaming).

7. The method as claimed in claim 1 wherein the media file comprises an audio track and a video track; and
   receiving the requested chunk further comprises:
   receiving a requested chunk from the audio track of the media file; and
   receiving a requested chunk from the video track of the media file.

8. The method as claimed in claim 7 further comprising:
   asynchronously receiving the requested chunk from the audio track of the media file and the requested chunk from the video track of the media file; and
   synchronously streaming the requested chunk from the audio track of the media file and the requested chunk from the video track of the media file to the client device.

9. The method as claimed in claim 7 further comprising:
   synchronously receiving the requested chunk from the audio track of the media file and the requested chunk from the video track of the media file; and
   synchronously streaming the requested chunk from the audio track of the media file and the requested chunk from the video track of the media file to the client device.

10. A system configured to stream a media file from a server computer to a client device, the system comprising:
    a processor;
    a memory device comprising computer readable instructions stored thereon for execution by the processor, forming:
    a receiving chunk request module configured to receive a requested chunk of the media file from the server computer;
    a data streamed overlap detection module configured to determine that a range of the requested chunk overlaps with data from a current chunk streamed to the client device;
    a logical successor in media file detection module configured to detect that the requested chunk is a logical successor to the current chunk; and
    a chunk streaming module configured to:
       stream the requested chunk to the client device at a throttled rate provided that one or more of the following conditions are met:
       (i) the range of the requested chunk overlaps with data from a current chunk streamed to the client device;
       (ii) the requested chunk is a logical successor to the current chunk;
       otherwise stream the requested chunk to the client device at a burst rate for at least a predetermined burst duration, wherein the burst rate is equal to a burst factor times the throttle rate, and a value of the burst factor is from about 2 to about 10.

11. The system of claim 10 wherein a value of the predetermined burst duration is chosen from a range from about 1 msec. to about 10 sec.

12. The system of claim 10, further comprising a burst duration module configured to determine that the requested chunk has been streamed to the client device for the predetermined burst duration.

13. The system of claim 10, further comprising a back in media file detection module for detecting that the requested chunk precedes in the media file with respect to the current chunk; and
    wherein the chunk streaming module is further configured to stream the requested chunk at the burst rate provided the range of the requested chunk precedes in the media file with respect to the current chunk.

14. The system of claim 10, further comprising an entire media file detection module for detecting that the range of the requested chunk includes an entire media file, and wherein:
the chunk streaming module is further configured to stream the requested chunk at the burst rate provided the range of the requested chunk includes the entire media file.

15. The system as claimed in claim 10 wherein the media file comprises an audio track and a video track; and
the receiving chunk request module is further configured to asynchronously receive:
a requested chunk from the audio track of the media file; and
a requested chunk from the video track of the media file.

16. The system as claimed in claim 15 further comprising a track synchronization module configured to synchronize streaming of the requested chunk from the audio track of the media file and the requested chunk from the video track of the media file to the client device.

17. The system as claimed in claim 10 wherein the media file comprises an audio track and a video track; and
the receiving chunk request module is further configured to synchronously receive:
a requested chunk from the audio track of the media file; and
a requested chunk from the video track of the media file.

18. The system as claimed in claim 17 further comprising a track synchronization module configured to synchronize streaming of the requested chunk from the audio track of the media file and the requested chunk from the video track of the media file to the client device.

19. The system of claim 10 wherein a type of protocol used for streaming the media file from the server to the client device is chosen from a list consisting of HTTP (Hyper-Text Transfer Protocol), HTTPS (HTTP Secure), Bluetooth, MPEG-DASH (Motion Picture Expert Group-Dynamic Adaptive Streaming over HTTP) and HLS (HTTP Live Streaming).

20. A system for streaming a media file from a server computer to a client device, comprising:
a processor;
a memory device having computer readable instructions stored thereon for execution by the processor, causing the processor to:
(a) receive a requested chunk of the media file from the server computer;
(b) provided one or more of the following conditions are met:
(i) a range of the requested chunk overlaps with data from a current chunk streamed to the client device;
(ii) the requested chunk is a logical successor to the current chunk;
stream the requested chunk to the client device at a throttled rate; and
(c) otherwise, stream the requested chunk to the client device at a burst rate for at least a predetermined burst duration, wherein the burst rate is equal to a burst factor times the throttle rate, and a value of the burst factor is from about 2 to about 10.

21. The system of claim 20 wherein a value of the predetermined burst duration is chosen from about 1 msec. to about 10 sec.

* * * * *